United States Patent
Jin et al.

(10) Patent No.: US 11,451,364 B2
(45) Date of Patent: Sep. 20, 2022

(54) METHOD AND APPARATUS FOR APPLYING UPLINK 7.5 KHZ FREQUENCY SHIFTING WHEN LTE CELL AND NR CELL COEXIST IN TDD BAND IN NEXT GENERATION MOBILE COMMUNICATION SYSTEM

(71) Applicant: Samsung Electronics Co., Ltd., Suwon-si (KR)

(72) Inventors: Seungri Jin, Suwon-si (KR); Soenghun Kim, Suwon-si (KR); Suyoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 159 days.

(21) Appl. No.: 16/832,880

(22) Filed: Mar. 27, 2020

(65) Prior Publication Data
US 2020/0313838 A1 Oct. 1, 2020

(30) Foreign Application Priority Data

Mar. 28, 2019 (KR) ........................ 10-2019-0035974
May 2, 2019 (KR) ........................ 10-2019-0051740

(51) Int. Cl.
| | | |
|---|---|---|
| *H04L 5/14* | (2006.01) | |
| *H04W 48/12* | (2009.01) | |
| *H04W 76/27* | (2018.01) | |
| *H04W 8/24* | (2009.01) | |
| *H04W 72/04* | (2009.01) | |

(52) U.S. Cl.
CPC ............. *H04L 5/1469* (2013.01); *H04W 8/24* (2013.01); *H04W 72/0453* (2013.01); *H04W 76/27* (2018.02)

(58) Field of Classification Search
CPC .. H04L 5/1469; H04W 8/24; H04W 72/0453; H04W 76/27; H04W 48/12; H04W 48/02; H04W 48/16
See application file for complete search history.

(56) References Cited

U.S. PATENT DOCUMENTS

| | | | | |
|---|---|---|---|---|
| 2006/0126558 A1* | 6/2006 | Lee | ....................... | H04W 36/14 370/329 |
| 2020/0396045 A1* | 12/2020 | Wang | ................... | H04L 5/0092 |
| 2021/0105772 A1* | 4/2021 | Wong | ................... | H04L 5/0091 |

* cited by examiner

*Primary Examiner* — Farid Seyedvosoghi
(74) *Attorney, Agent, or Firm* — Jefferson IP Law, LLP

(57) ABSTRACT

A communication scheme and a system therefor, which combines an IoT technology and a $5^{th}$ generation (5G) communication system for supporting a higher data transmission rate than a $4^{th}$ generation (4G) system is provided. The disclosure may be applied to a smart service (e.g., a smart home, a smart building, a smart city, a smart car or connected car, healthcare, digital education, retail business, a security and safety related service, or the like) based on the 5G communication technology and the IoT related technology. The disclosure provides a method of supporting an uplink transmission method for a user equipment (UE) when different systems coexist in a next generation mobile communication system.

18 Claims, 28 Drawing Sheets

METHOD AND APPARATUS FOR APPLYING UPLINK 7.5 KHZ FREQUENCY SHIFTING WHEN LTE CELL AND NR CELL COEXIST IN TDD BAND IN NEXT GENERATION MOBILE COMMUNICATION SYSTEM

CROSS-REFERENCE TO RELATED APPLICATION(S)

This application is based on and claims priority under 35 U.S.C. § 119(a) of a Korean patent application number 10-2019-0035974, filed on Mar. 28, 2019, in the Korean Intellectual Property Office and of a Korean patent application number 10-2019-0051740, filed on May 2, 2019, in the Korean Intellectual Property Office, the disclosure of each of which is incorporated by reference herein in its entirety.

BACKGROUND

1. Field

The disclosure relates to a method of supporting an uplink transmission method for a user equipment (UE) when different systems coexist in a next generation mobile communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a "Beyond 4G Network" or a "Post long term evolution (LTE) System". The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

As a next generation mobile communication system develops, there is a desire for a method and apparatus for supporting an uplink transmission method for a user equipment (UE) when different systems coexist.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of supporting the case in which systems having different uplink transmission methods coexist in a new radio (NR) system.

As an example, a predetermined band (frequency band) of the NR system may perform spectrum sharing (frequency band sharing) with a cell in long term evolution (LTE). The current NR system is capable of supporting spectrum sharing with LTE in a supplementary uplink (SUL) band and a frequency division duplex (FDD) band.

According to an embodiment, in the case of a UE that supports the NR system, it is specified that supporting uplink 7.5 kHz frequency shifting for an SUL band and an FDD band is mandatory. In addition, a basic configuration operation for supporting a time division duplex (TDD) band is needed.

According to the method proposed in the document, the compatibility issue between a legacy UE and UEs that support TDD uplink frequency shifting may be overcome.

Additional aspects will be set forth in part in the description which follows and, in part, will be apparent from the description, or may be learned by practice of the presented embodiments.

In accordance with an aspect of the disclosure, a method of processing a control signal in a wireless communication system is provided. The method includes receiving a first control signal transmitted from a base station, processing the received first control signal, and transmitting, to the base station, a second control signal generated based on the processing.

According to operation of a UE and a base station proposed in the disclosure, the case in which systems having different uplink transmission methods coexist may be supported even for a TDD band. According to an embodiment, spectrum sharing between LTE and NR, operating in a TDD band, may be supported. In addition, compatibility issue between a legacy UE and a new UE may be solved and thus, a service may be supported even when UEs having different capabilities exist in the corresponding TDD cell.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1FB is a diagram illustrating an initial cell access process (additional solution) for a TDD cell that supports 7.5 kHz frequency shifting in an NR system according to an embodiment of the disclosure;

FIG. 1GB is another diagram illustrating operation of a UE depending on an uplink 7.5 kHz frequency shifting capability, in an NR standalone (SA) mode according to the first embodiment of the disclosure;

FIG. 1GC is a diagram illustrating operation of a UE according to another solution (additional solution) that supports operation by connecting to a TDD cell that supports uplink 7.5 kHz frequency shifting, in an NR standalone (SA) mode according to the first embodiment of the disclosure;

FIG. 1IC is a diagram illustrating operation of a base station according to another solution (additional solution) that supports operation by connecting to a TDD cell that supports uplink 7.5 kHz frequency shifting, in an NR standalone (SA) mode according to the first embodiment of the disclosure;

FIG. 1O is a diagram illustrating bandwidth adaptation according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, the disclosure uses terms and names defined in 3rd generation partnership project long term evolution (3GPP LTE) standards for the convenience of description. However, the disclosure is not limited by these terms and names, and may be applied in the same way to systems that conform other standards.

Figure 1A:
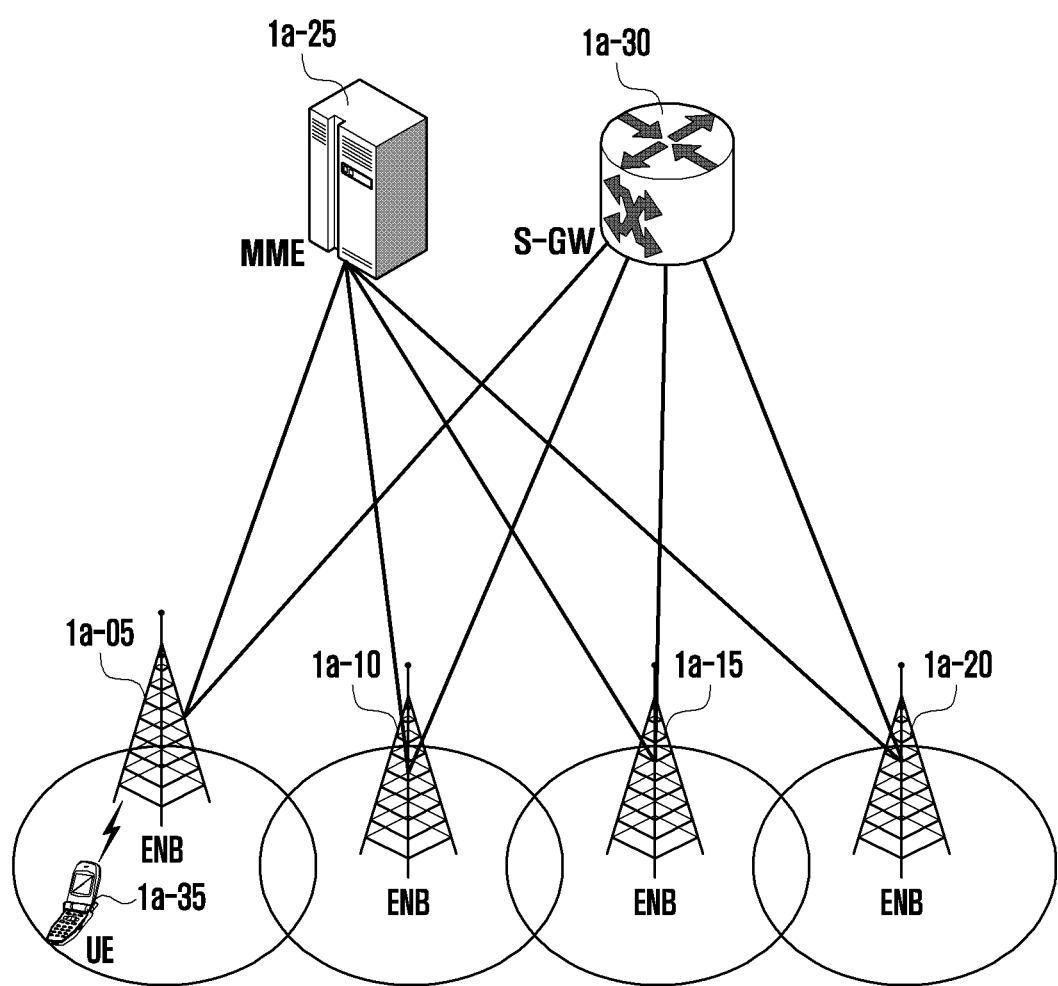
FIG. 1A is a diagram illustrating the structure of an LTE system according to an embodiment of the disclosure.

FIG. 1A is a diagram illustrating the structure of an LTE system according to an embodiment of the disclosure.

Referring to FIG. 1A, as illustrated in the drawing, a radio access network of an LTE system includes a next generation base station (an evolved Node B (eNB), a Node B, or a base station) 1a-05, 1a-10, 1a-15, and 1a-20, a mobility management entity (MME) 1a-25, and a serving-gateway (S-GW) 1a-30. A user equipment (UE) (or a terminal) 1a-35 accesses an external network via the eNB 1a-05 to 1a-20 and the S-GW 1a-30.

Referring to FIG. 1A, the eNB 1a-05 to 1a-20 corresponds to an existing node B in a universal mobile telecommunications system (UNITS) system. The eNB is connected to the UE 1a-35 via a wireless channel, and performs a more complicated role than the existing node B. In the LTE system, real-time services, such as a voice over Internet protocol (IP) (VoIP) based on an Internet protocol, and all user traffic are provided via a shared channel. Accordingly, there is a desire for a device that performs scheduling by collecting state information, such as the buffer state, an available transmission power state, a channel state, and the like associated with UEs, and the eNB 1a-05 to 1a-20 may be in charge of it. One eNB generally controls a plurality of cells. For example, in order to implement a transmission rate of 100 Mbps, the LTE system uses an orthogonal frequency division multiplexing (OFDM) as a radio access technology in a bandwidth of 20 MHz. Also, an adaptive modulation & coding (AMC) scheme that determines a modulation scheme and a channel coding rate may be applied based on the channel state of a UE. The S-GW 1a-30 is a device for providing a data bearer, and generates or removes a data bearer according to the control of the MME 1a-25. The MME is a device that is in charge of various control functions, in addition to a mobility management function associated with a UE, and may be connected to a plurality of eNBs.

Figure 1B:
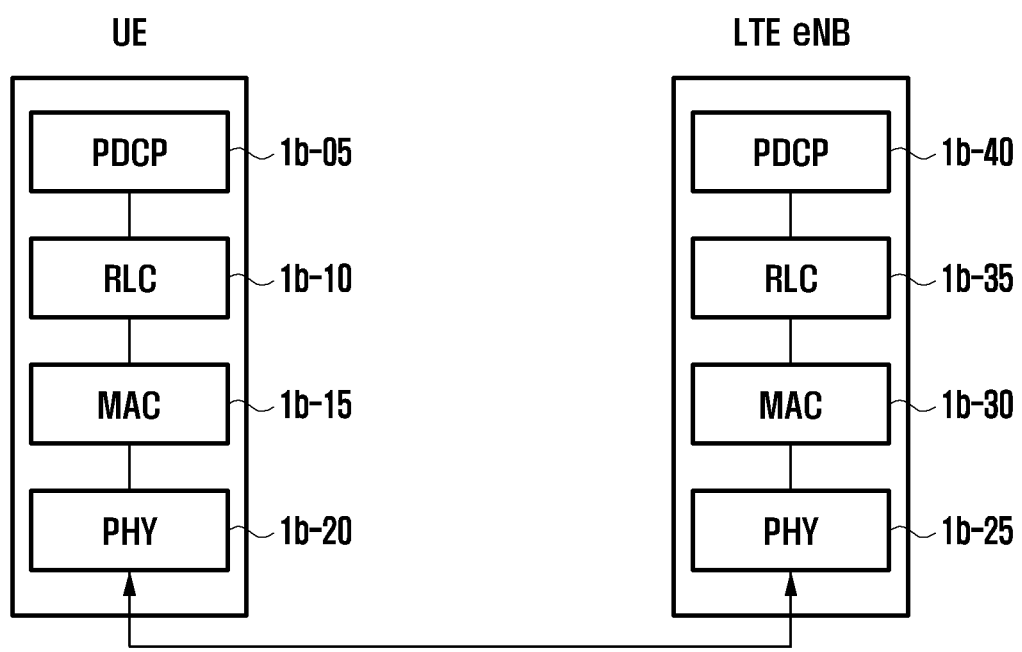
FIG. 1B is a diagram illustrating the structure of a radio protocol of an LTE system according to an embodiment of the disclosure.

FIG. 1B is a diagram illustrating the structure of a radio protocol of an LTE system according to an embodiment of the disclosure.

Referring to FIG. 1B, the radio protocol of the LTE system may include a packet data convergence protocol (PDCP) 1b-05 and 1b-40, a radio link control (RLC) 1b-10 and 1b-35, a medium access control (MAC) 1b-15 and 1b-30 for each of a UE and an eNB. The PDCP 1b-05 and 1b-40 is in charge of IP header compression/decompression. The main functions of the PDCP are summarized as follows.

header compression and decompression: robust header compression (ROHC) only
    transfer of user data
    sequential delivery (in-sequence delivery of upper layer packet data units (PDUs) at PDCP re-establishment procedure for RLC acknowledged mode (AM))
    reordering (for split bearers in DC (only support for RLC AM): PDCP PDU routing for transmission and PDCP PDU reordering for reception)
    duplicate detection (duplicate detection of lower layer service data units (SDUs) at PDCP re-establishment procedure for RLC AM)
    retransmission (retransmission of PDCP SDUs at handover and, for split bearers in DC, of PDCP PDUs at PDCP data-recovery procedure, for RLC AM)
    ciphering and deciphering
    timer-based SDU discard (timer-based SDU discard in uplink)

A radio link control (RLC) 1b-10 and 1b-35 reestablishes a PDCP packet data unit (PDU) in an appropriate size, and performs automatic repeat request (ARQ) or the like. The main functions of the RLC are summarized as follows.

transfer of data (transfer of upper layer PDUs)
    ARQ (error correction via ARQ (only for AM data transfer))
    concatenation, segmentation, and reassembly (concatenation, segmentation and reassembly of RLC SDUs (only for unacknowledged mode (UM) and AM data transfer))
    re-segmentation (re-segmentation of RLC data PDUs (only for AM data transfer))
    reordering (reordering of RLC data PDUs (only for UM and AM data transfer)
    duplicate detection (duplicate detection (only for UM and AM data transfer))
    error detection (protocol error detection (only for AM data transfer))
    RLC SDU discard (RLC SDU discard (only for UM and AM data transfer))
    RLC re-establishment The MAC 1b-15 and 1b-30 is connected to various RLC layer devices configured for one UE, and multiplexes RLC PDUs to a MAC PDU and demultiplexes RLC PDUs from a MAC PDU. The main functions of the MAC are summarized as follows.

mapping (mapping between logical channels and transport channels)
    multiplexing and demultiplexing (multiplexing/demultiplexing of MAC SDUs belonging to one or different logical channels into/from transport blocks (TB) delivered to/from the physical layer on transport channels)
    scheduling information reporting
    hybrid ARQ (HARQ) (error correcting via HARQ)
    priority handling between logical channels (priority handling between logical channels of one UE)
    priority handling between UEs (priority handling between UEs by means of dynamic scheduling)
    multimedia broadcast/multicast service (MBMS) service identification
    transport format selection
    padding The physical (PHY) layer 1b-20 and 1b-25 performs channel-coding and modulating of higher layer data to generate an OFDM symbol and transmits the OFDM symbol via a wireless channel, or demodulates and performs channel-decoding of an OFDM symbol received via a wireless channel and transmits the demodulated and channel-decoded OFDM symbol to a higher layer. Also, in the physical layer, in order to perform additional error correction, hybrid ARQ (HARQ) is used. A reception end transmits one bit indicating whether a packet transmitted from a transmission end is received. This is referred to as HARQ ACK/NACK information. Downlink HARQ ACK/NACK information associated with uplink transmission may be transmitted via a physical hybrid-ARQ indicator channel (PHICH). Uplink HARQ ACK/NACK information associated with downlink transmission may be transmitted via a physical uplink control channel (PUCCH) or a physical uplink shared channel (PUSCH).

The PHY layer may include one or multiple frequencies/carriers. A technology that simultaneously configures multiple frequencies to use is referred to as carrier aggregation (CA). CA is a technology that uses one or multiple subcarriers in addition to a main carrier so as to dramatically increase the amount of transmission in proportion to the number of the subcarriers, compared to the scheme of the related art that uses only a single carrier for communication between a user equipment (UE) and an evolved UMTS terrestrial radio access network (E-UTRAN) NodeB (eNB). In LTE, a cell in a base station that uses a main carrier is referred to as a primary cell (PCell), and a subcarrier is referred to as a secondary cell (SCell).

Although not illustrated in the drawing, a radio resource control (RRC) layer exists above the PDCP layer of each of the UE and the eNB. In the RRC layer, configuration control messages related to access and measurement may be transmitted or received for radio resource control.

Figure 1C:
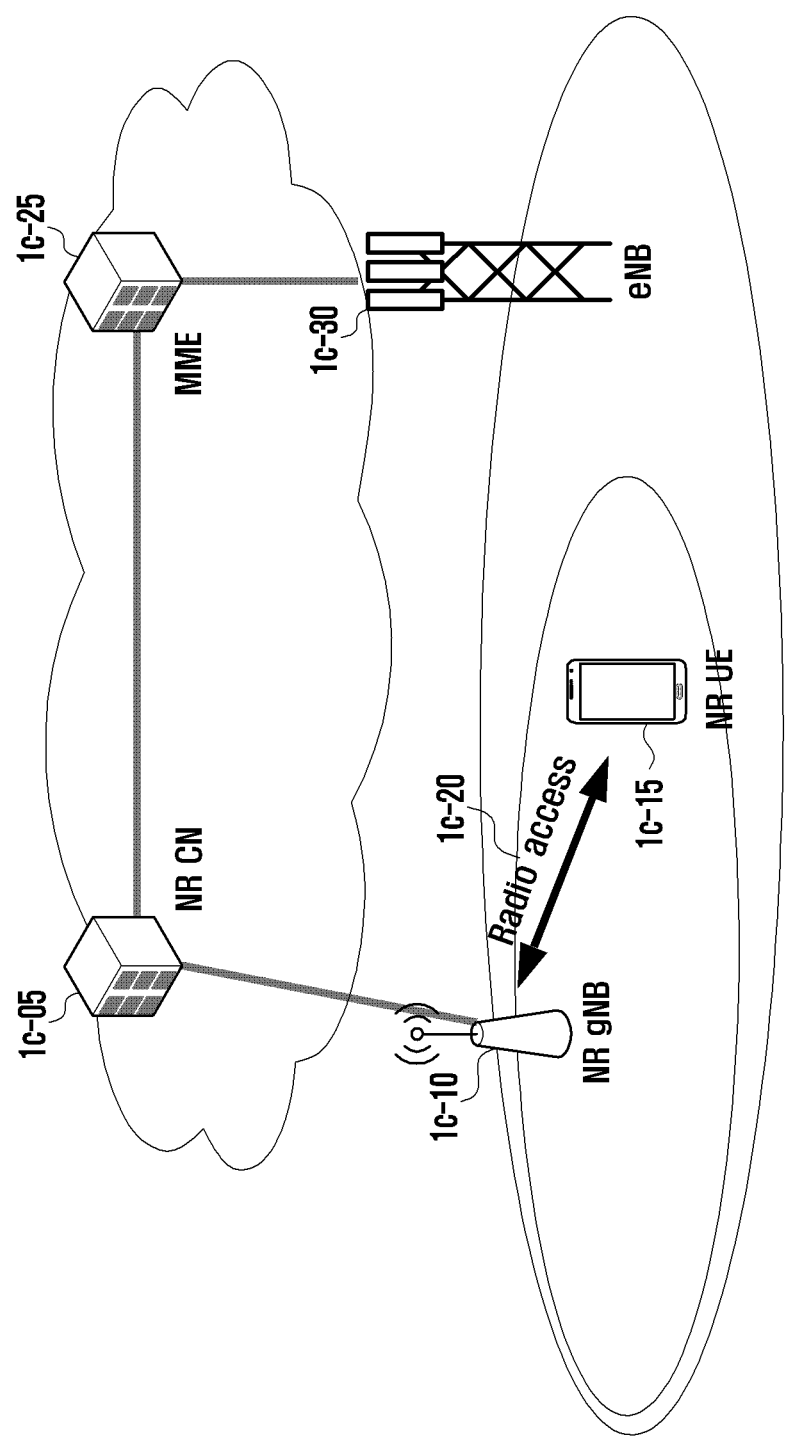
FIG. 1C is a diagram illustrating the structure of a next generation mobile communication system according to an embodiment of the disclosure.

FIG. 1C is a diagram illustrating the structure of a next generation mobile communication system according to an embodiment of the disclosure.

Referring to FIG. 1C, a radio access network of a next generation mobile communication system includes a next generation base station (a new radio node B (NR NB) or a gNB) 1c-10 and a new radio core network (NR CN) (or a next generation core network (NG CN)) 1c-05 as illustrated in the drawing. A new radio user equipment (NR UE) (or a UE) 1c-15 may access an external network via an NR NB 1c-10 and an NR CN 1c-05.

Referring to FIG. 1C, the NR NB 1c-10 corresponds to an evolved nodeB (eNB) of a legacy LTE system. The NR gNB is connected to the NR UE 1c-15 via a wireless channel, and may provide a better service than a service from a legacy eNodeB. In the next generation mobile communication system, all user traffic is serviced via a shared channel. Accordingly, there is a desire for a device that performs scheduling by collecting state information such as a buffer state, an available transmission power state, a channel condition, and the like in association with UEs. The NR NB 1c-10 takes charge of the same. A single NR gNB generally controls a plurality of cells. In order to implement ultra-high speed data transmission when compared to legacy LTE, a bandwidth greater than or equal to the current maximum bandwidth may be used, and an orthogonal frequency division multiplexing (OFDM) is used as a radio access technology and a beamforming technology is additionally used. Also, an adaptive modulation & coding (AMC) scheme that determines a modulation scheme and a channel coding rate may be applied based on the channel state of a UE. The NR CN 1c-05 performs a function of supporting mobility, configuring a bearer, configuring a quality of service (QoS), and the like. The NR CN is a device that is in charge of various control functions in addition to a mobility management function associated with a UE, and may be connected to a plurality of base stations. Also, the next generation mobile communication system may interoperate with a legacy LTE system, and an NR CN is connected to an MME 1c-25 via a network interface. The MME may be connected to an eNB 1c-30 which is a legacy base station.

Figure 1D:
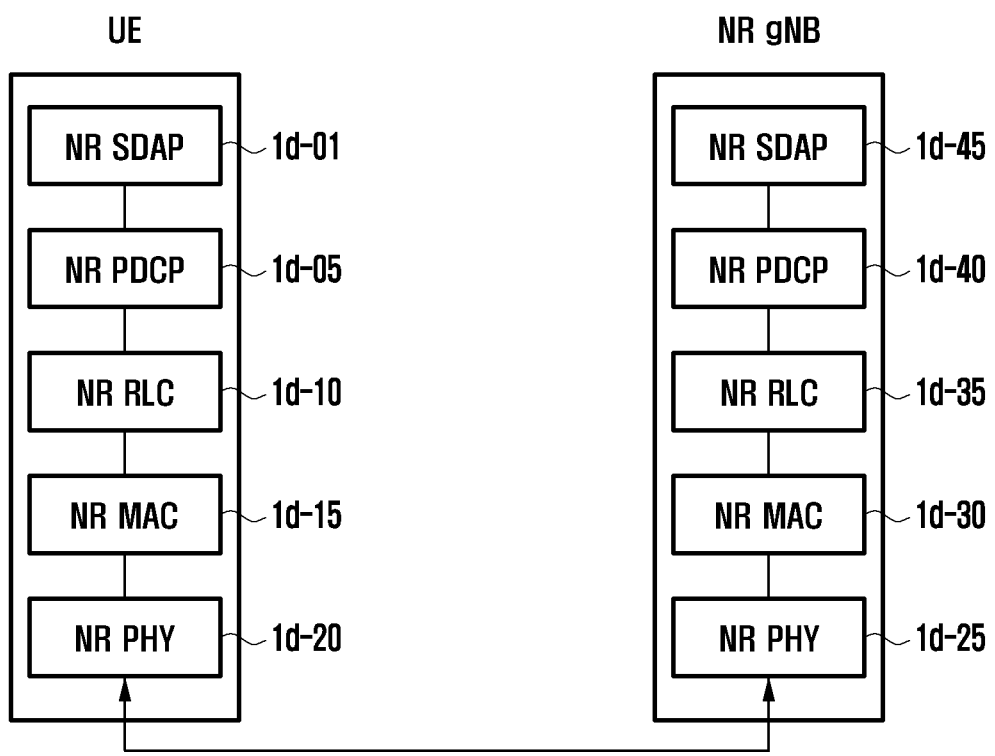
FIG. 1D is a diagram illustrating the structure of a radio protocol of a next generation mobile communication system according to an embodiment of the disclosure.
Figure 1E:
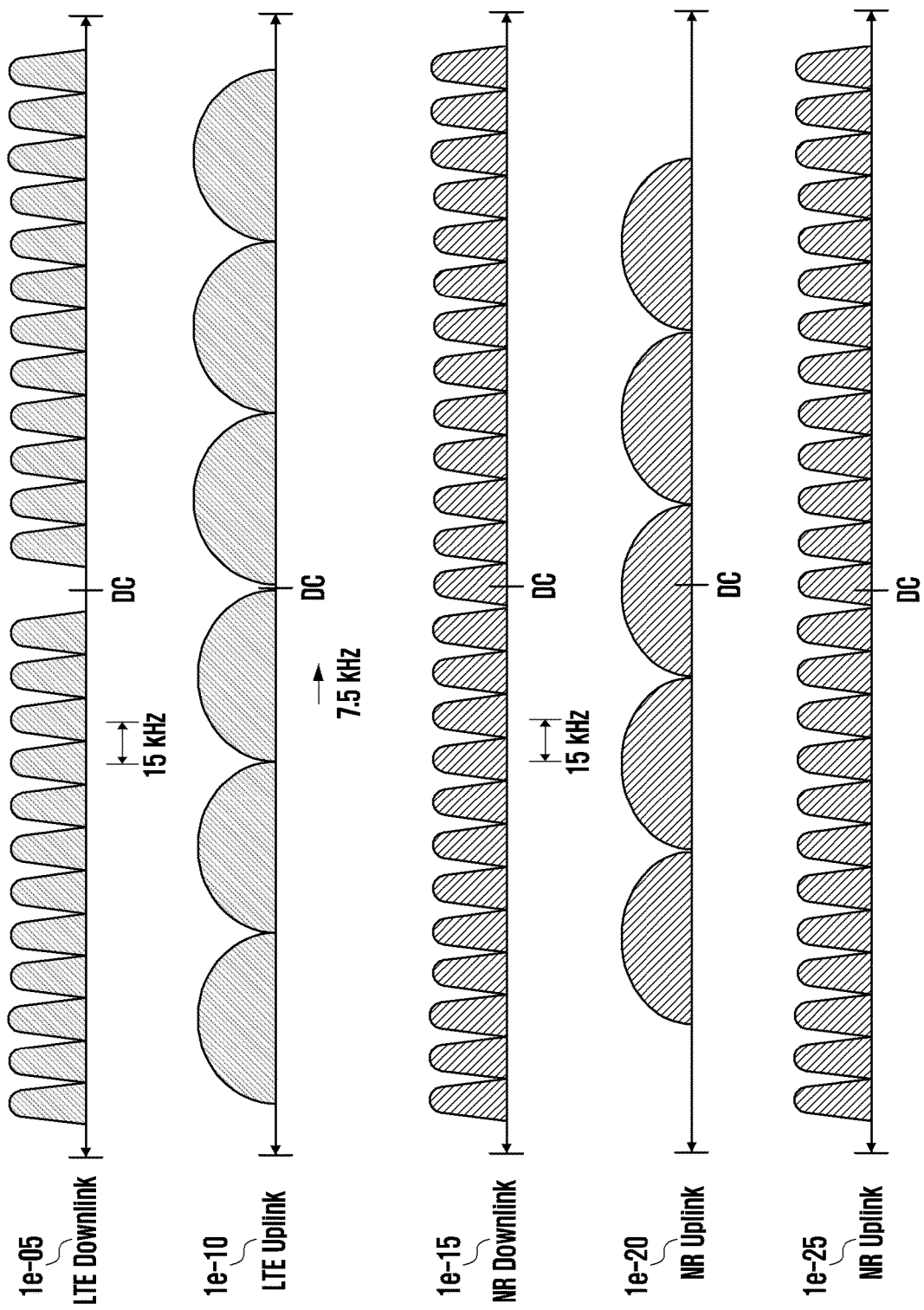
FIG. 1E is a diagram illustrating a structure in the frequency axis and a resource transferring method in an LTE system and an NR system according to an embodiment of the disclosure.
Figure 1F:
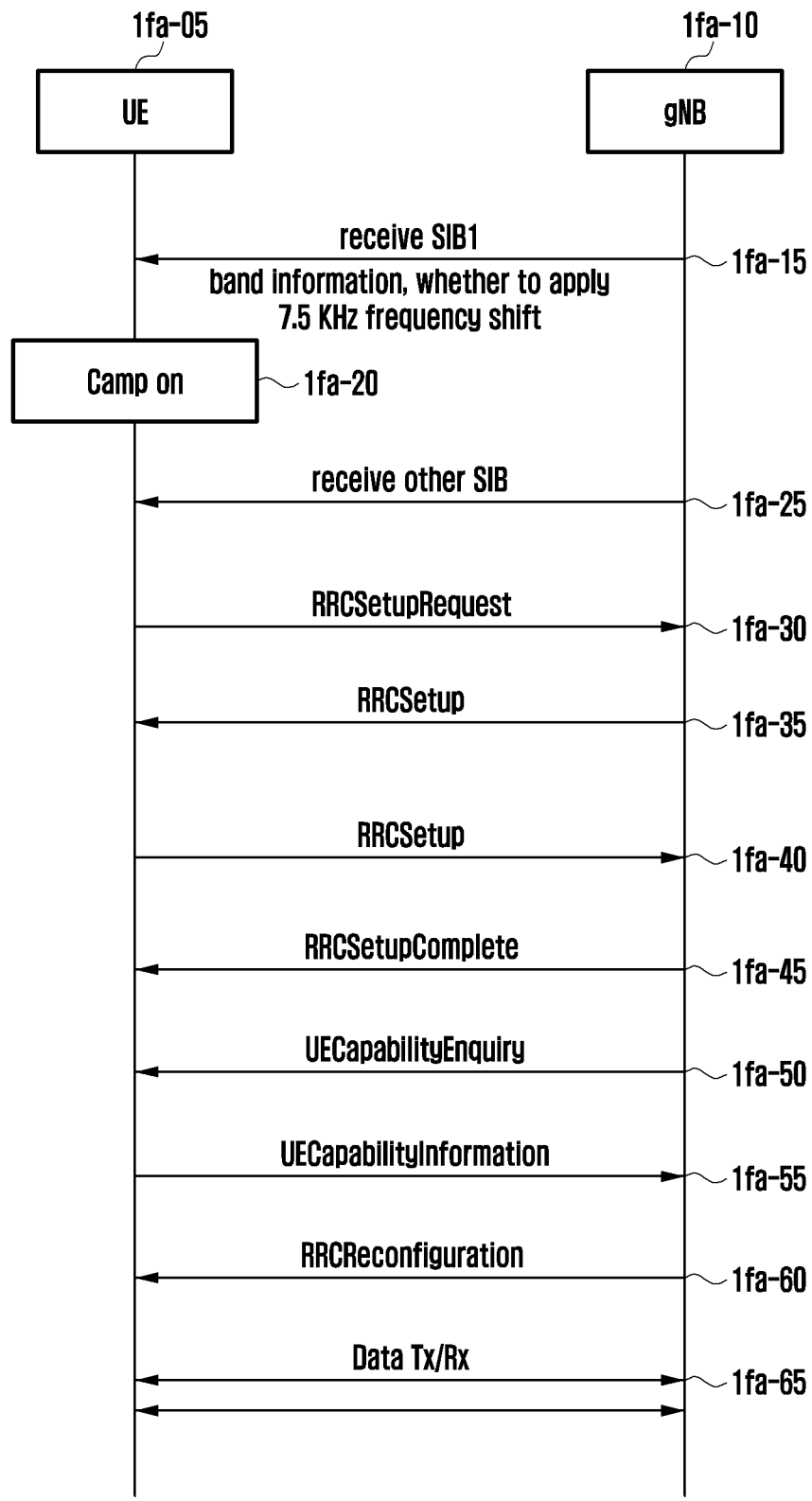
FIG. 1FA is a diagram illustrating an initial cell access process in an NR system according to an embodiment of the disclosure.
Figure 1F:
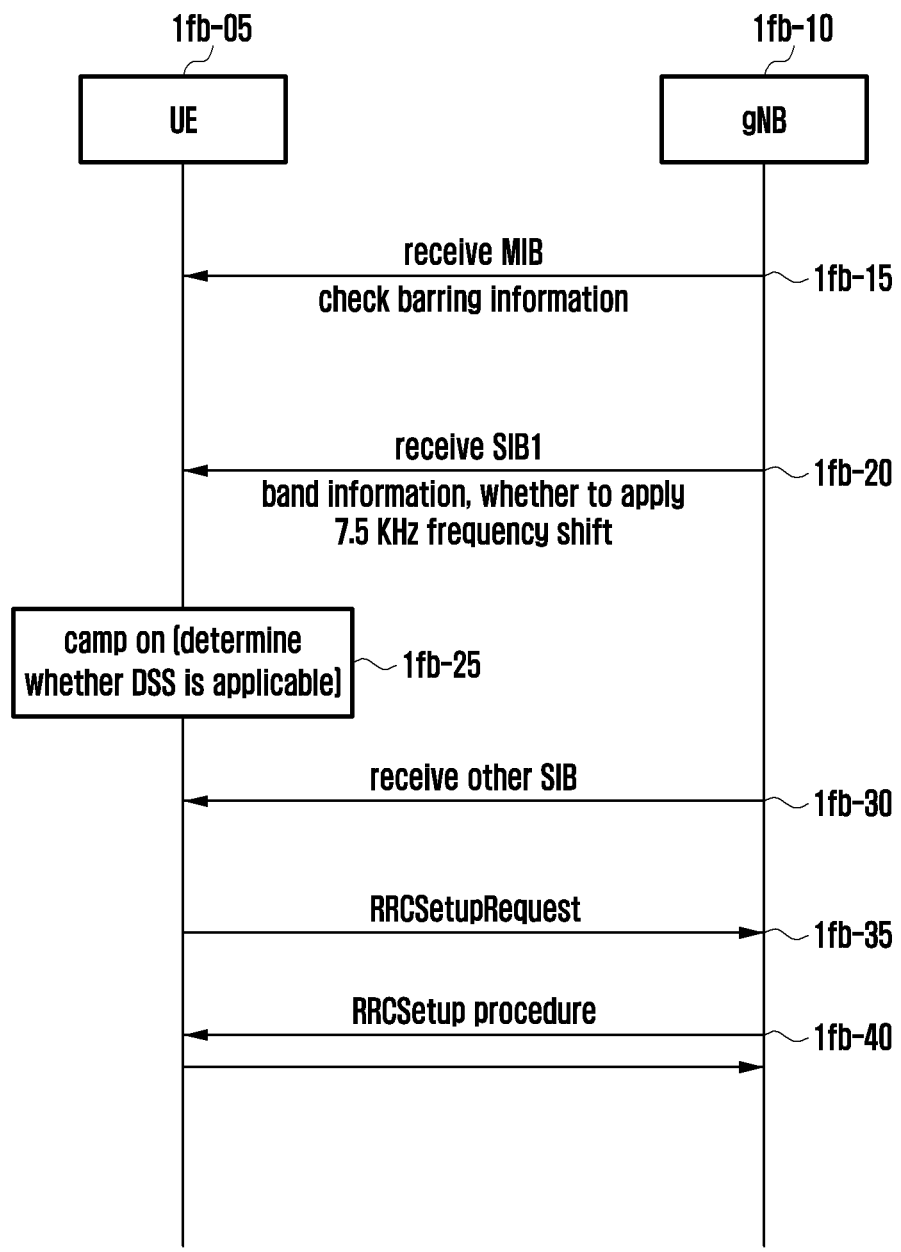
Figure 1G:
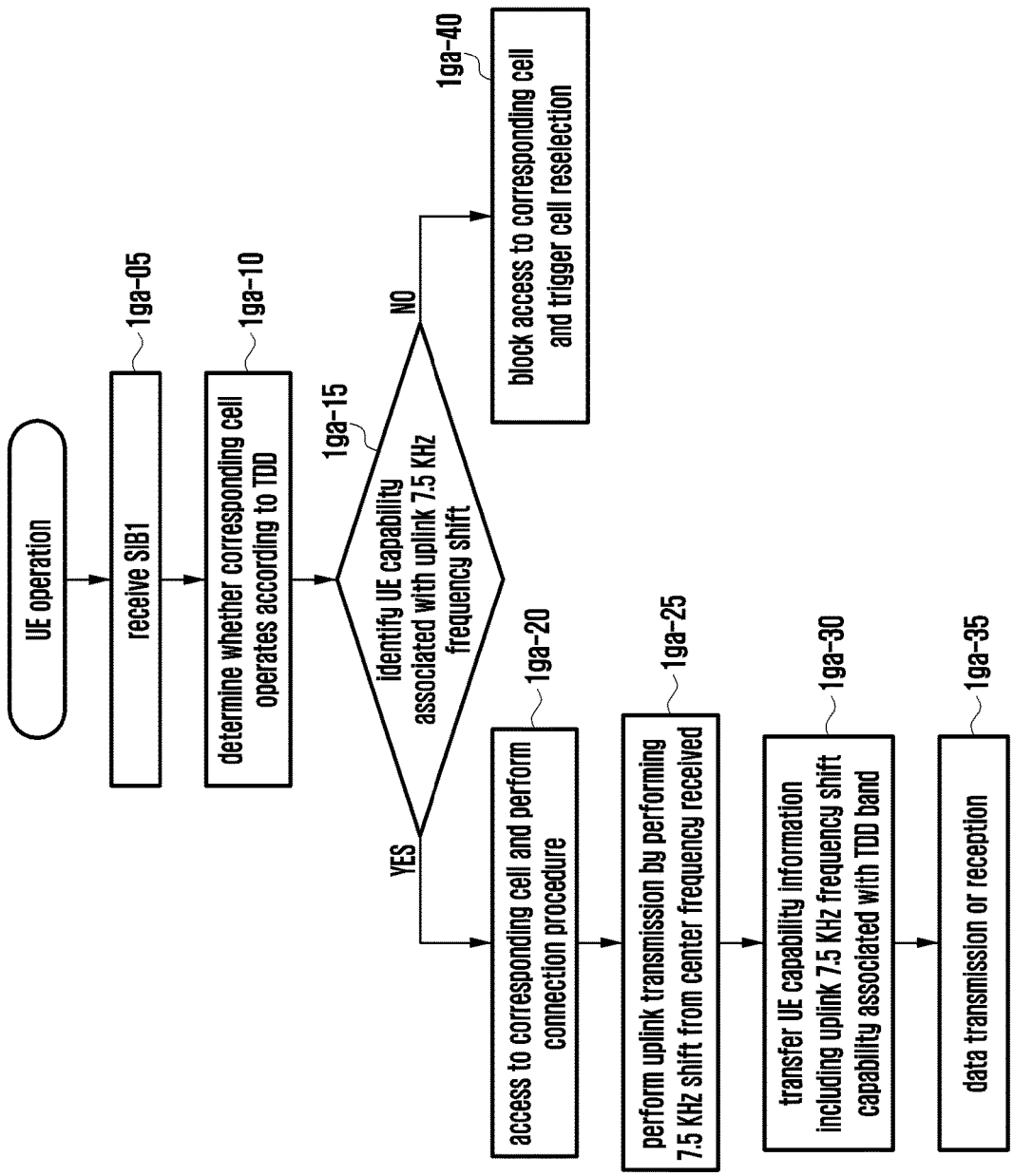
FIG. 1GA is a diagram illustrating operation of a user equipment (UE) depending on an uplink 7.5 kHz frequency shifting capability, in an NR standalone (SA) mode according to a first embodiment of the disclosure.
Figure 1G:
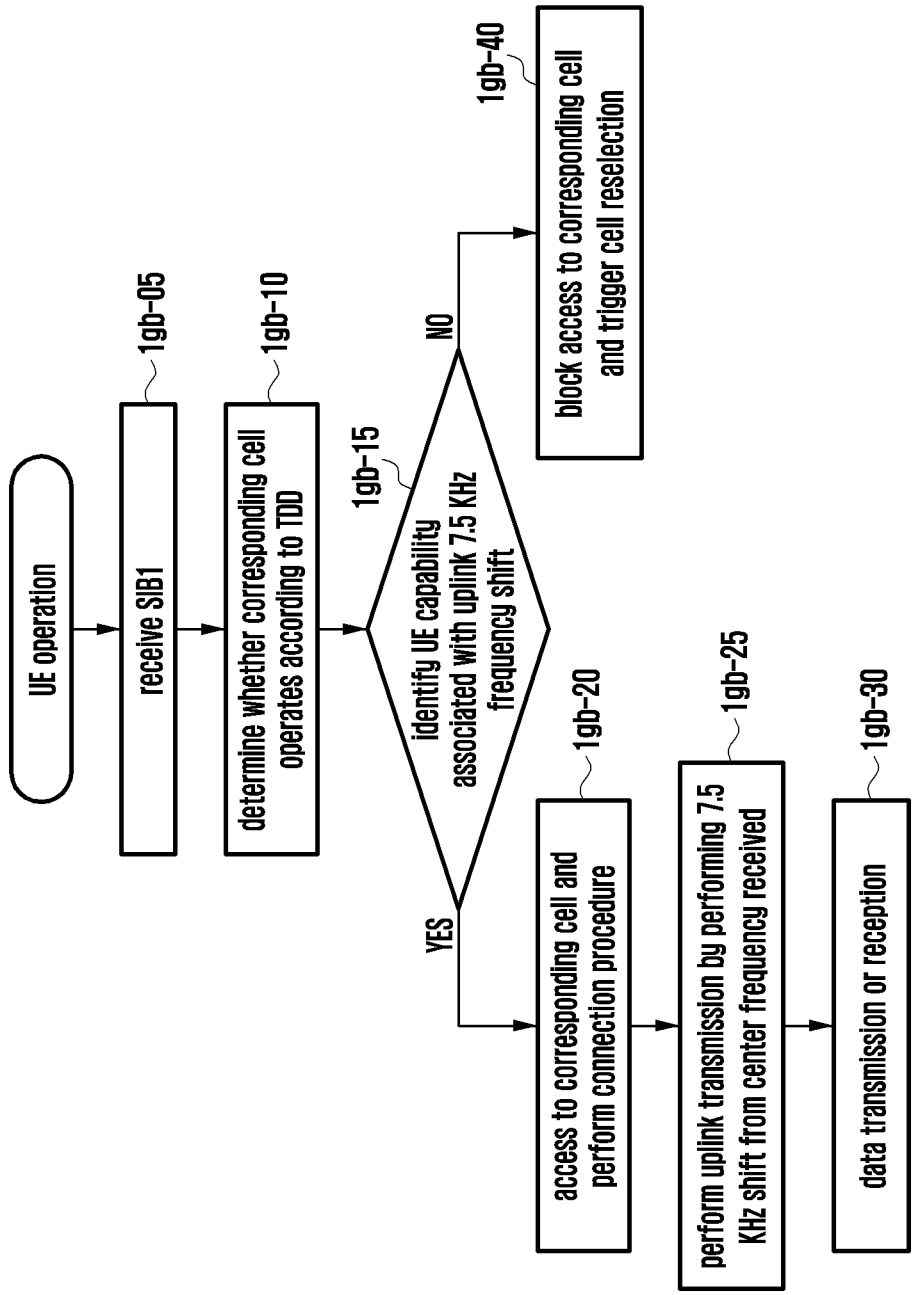
Figure 1G:
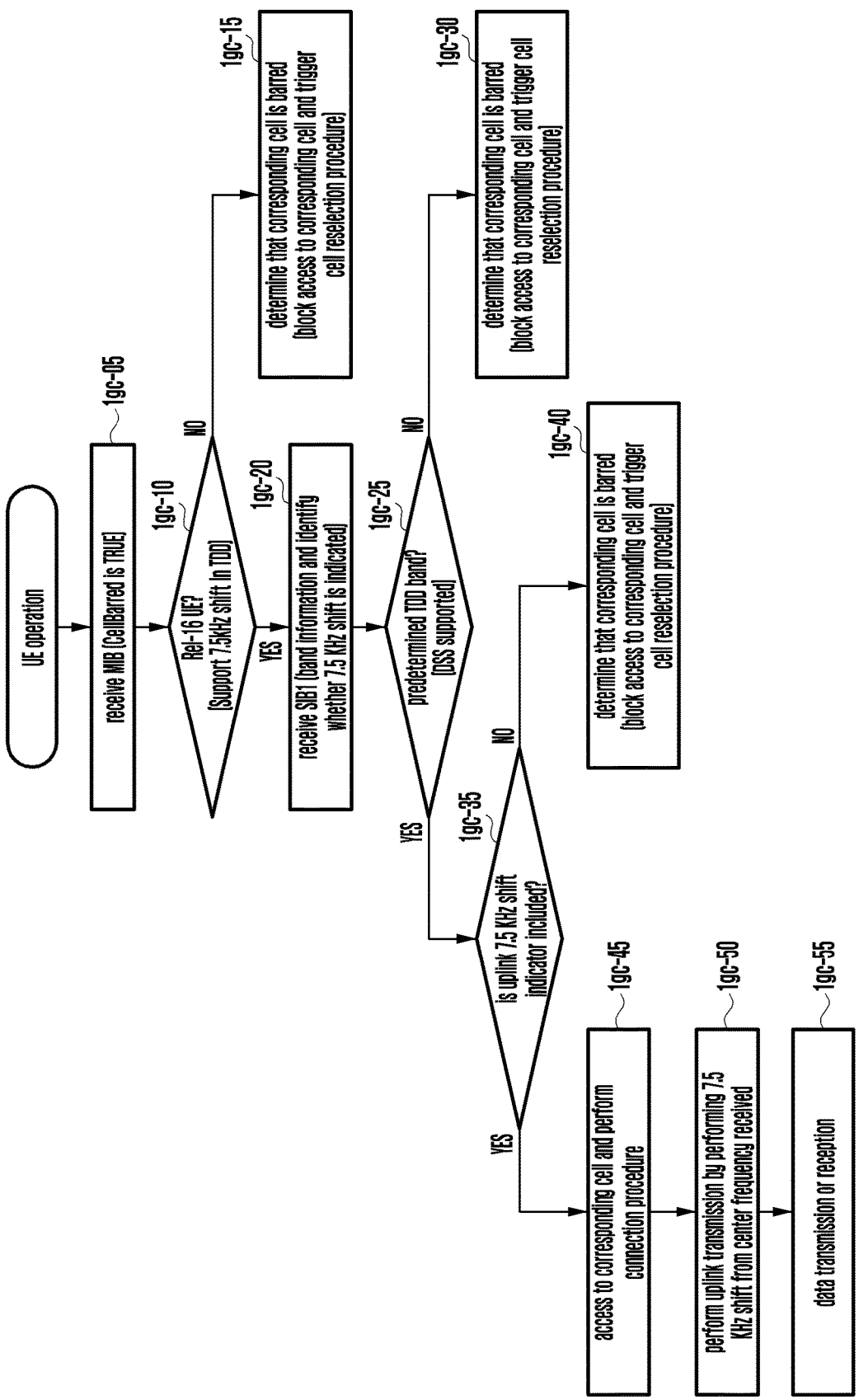
Figure 1H:
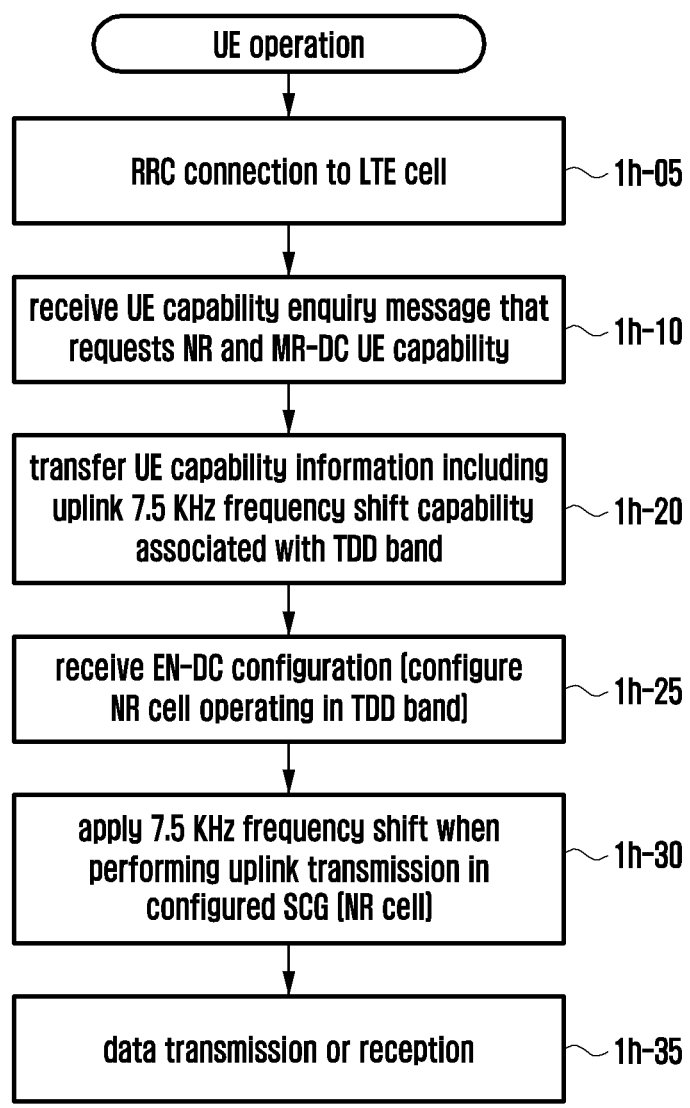
FIG. 1H is a diagram illustrating operation of a UE depending on an uplink 7.5 kHz frequency shifting capability, in evolved universal terrestrial radio access (E-UTRA) NR dual connectivity (EN-DC) (non-standalone (NSA)) according to a second embodiment of the disclosure.
Figure 1I:
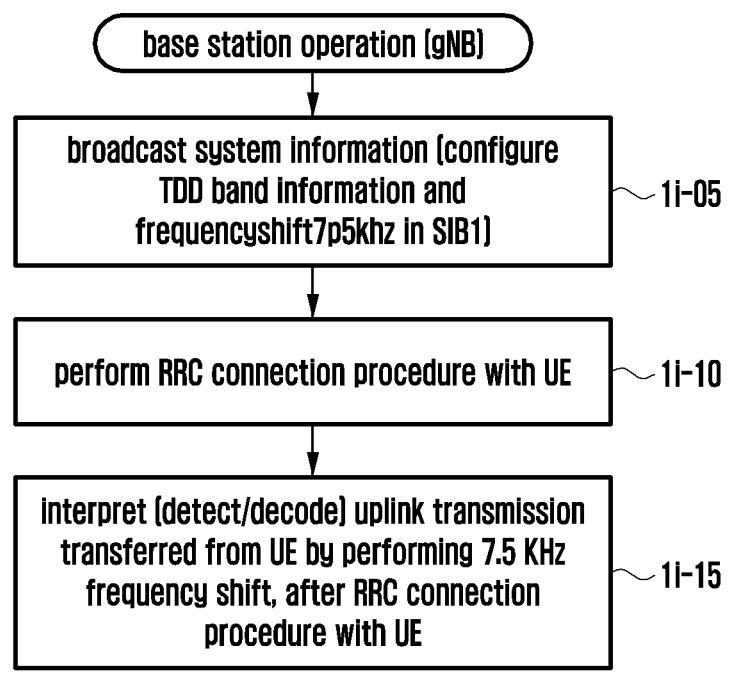
FIG. 1I is a diagram illustrating operation of a base station depending on an uplink 7.5 kHz frequency shifting capability, in an NR standalone (SA) mode according to the first embodiment of the disclosure.
Figure 1I:
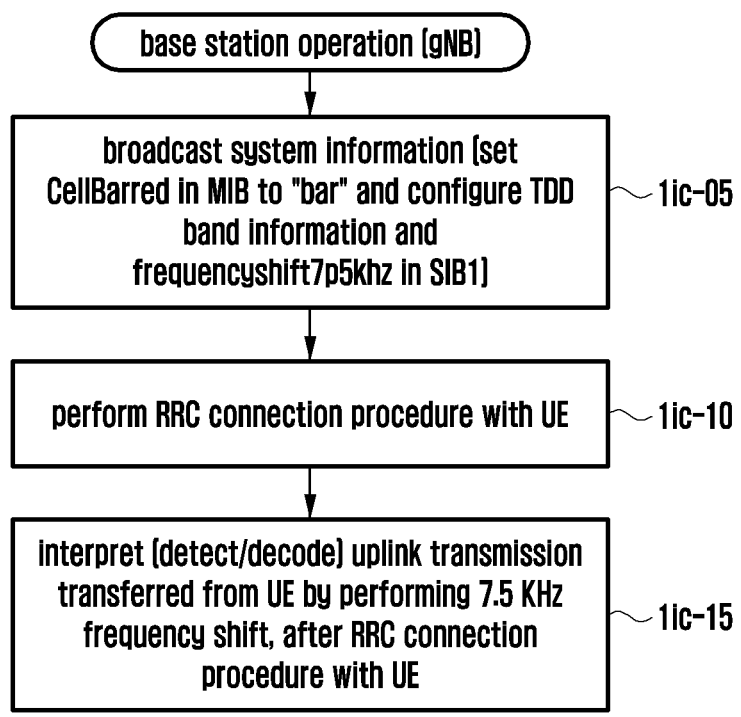
Figure 1J:
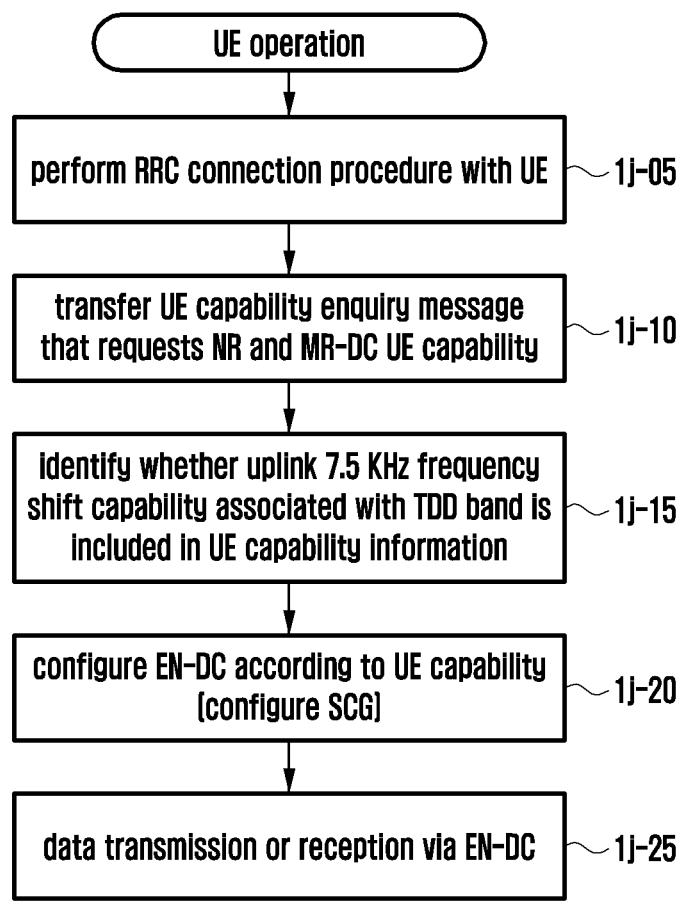
FIG. 1J is a diagram illustrating operation of a base station depending on an uplink 7.5 kHz frequency shifting capability, in EN-DC (non-standalone (NSA)) according to the second embodiment of the disclosure.
Figure 1K:
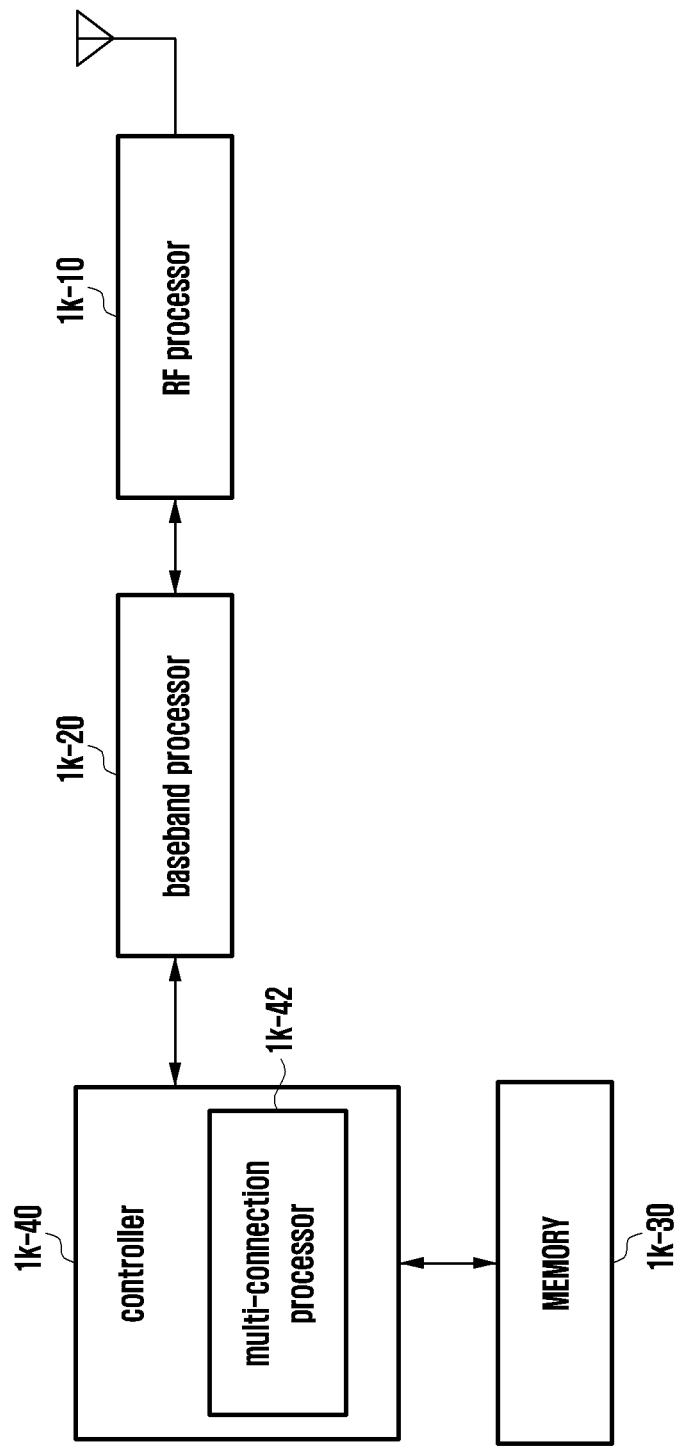
FIG. 1K is a block diagram illustrating an internal structure of a UE according to an embodiment of the disclosure.
Figure 1L:
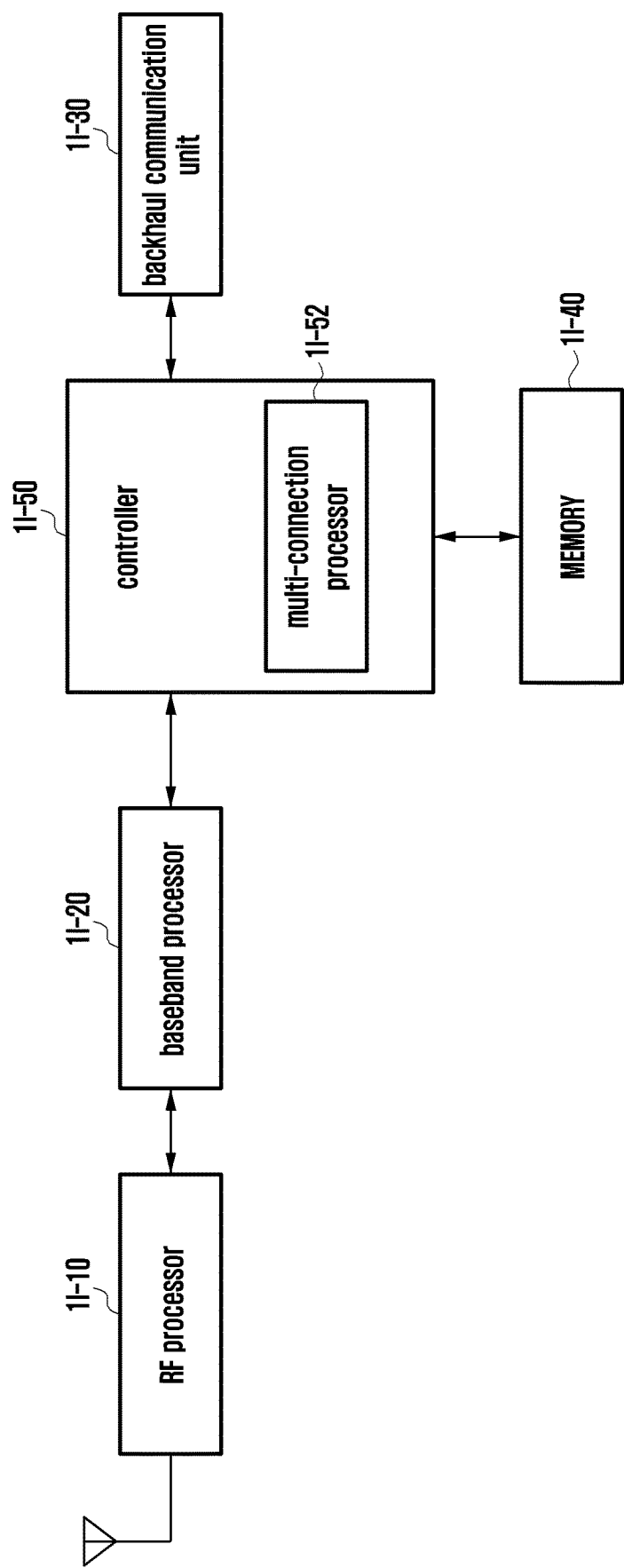
FIG. 1L is a block diagram illustrating the configuration of a base station according to an embodiment of the disclosure.
Figure 1M:
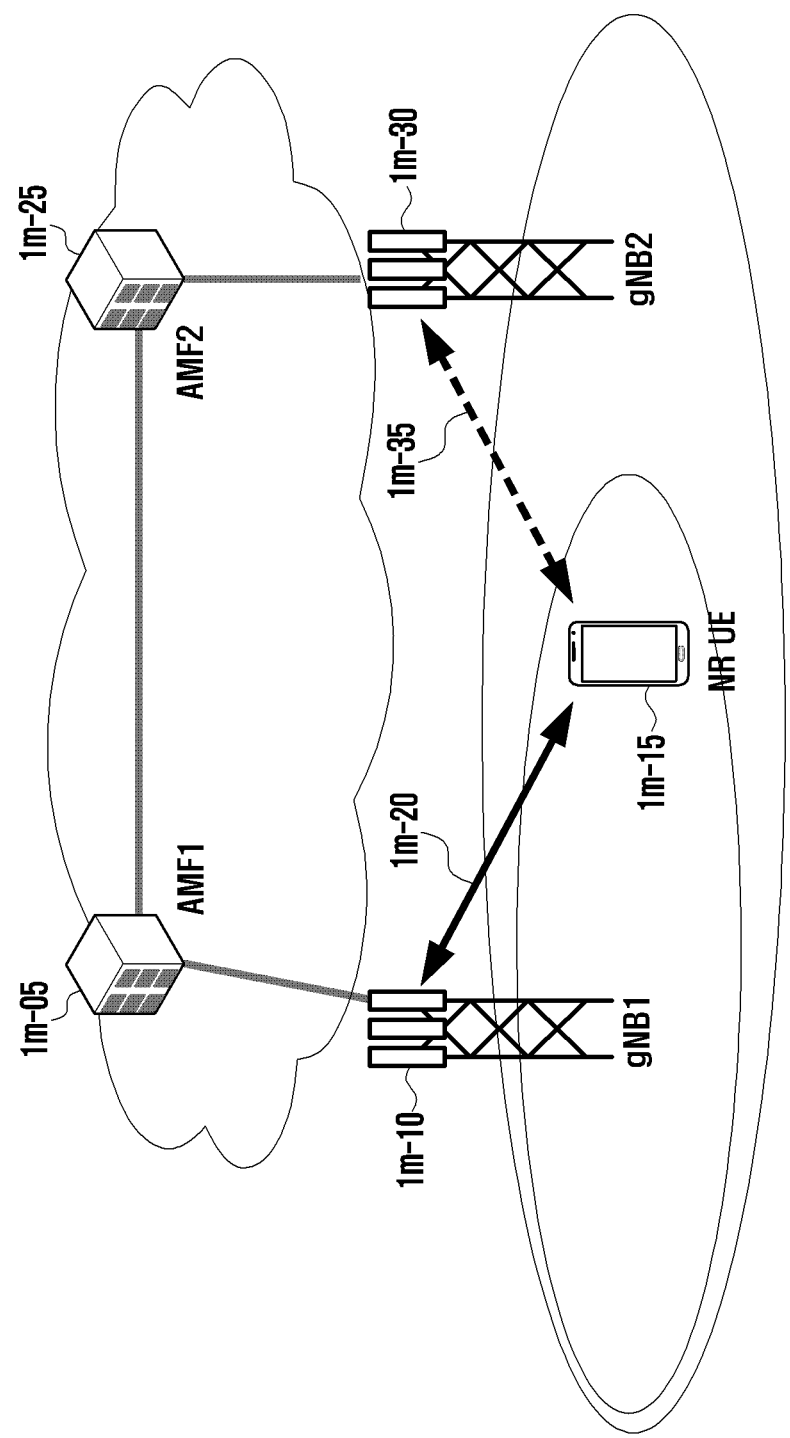
FIG. 1M is a diagram illustrating an embodiment of the structure of a next generation mobile communication system according to an embodiment of the disclosure.

FIG. 1M is a diagram illustrating an example of the configuration of an NR-DC according to an embodiment of the disclosure.

Figure 1N:
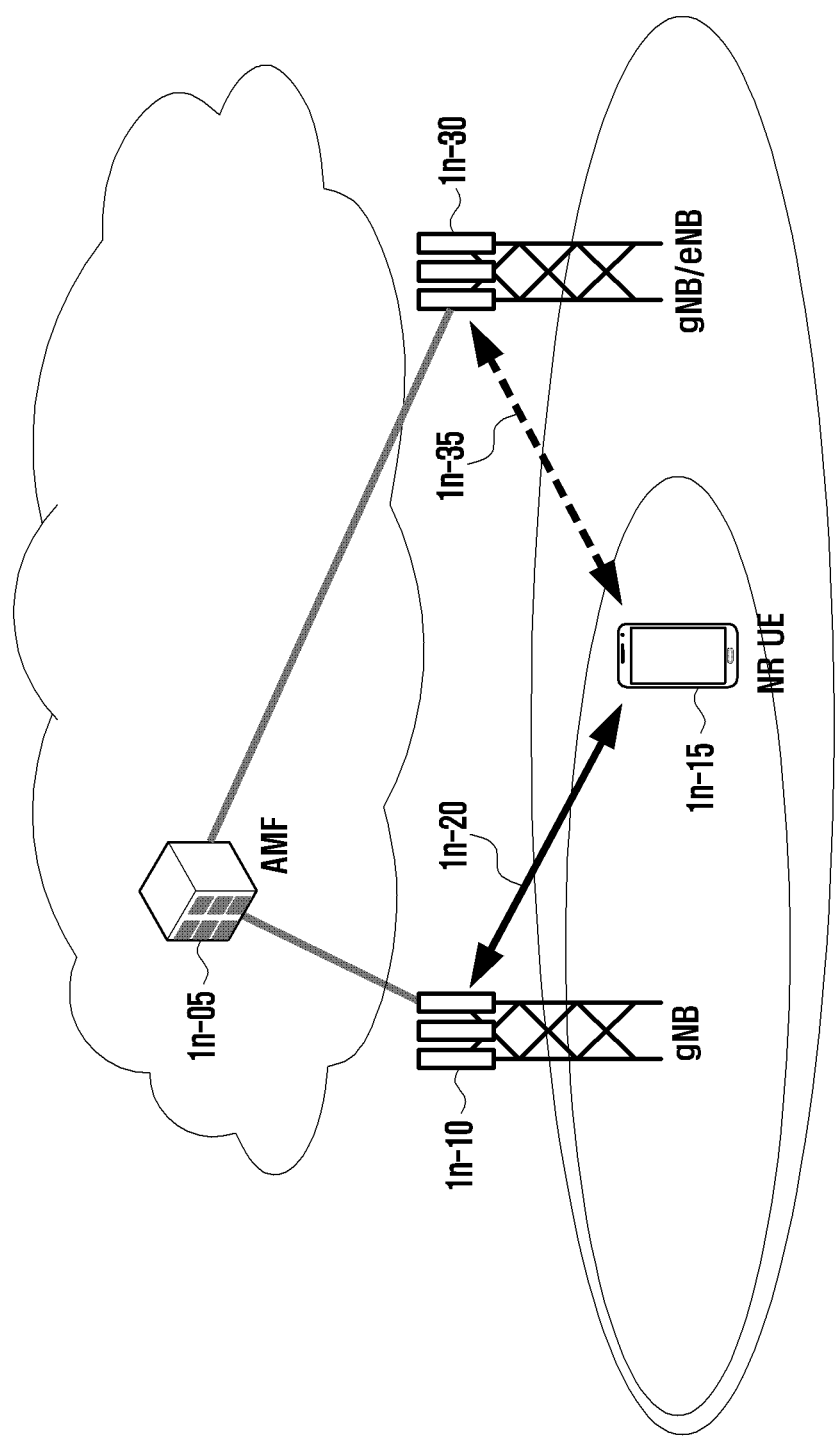
FIG. 1N is a diagram illustrating an embodiment of the structure of a next generation mobile communication system according to an embodiment of the disclosure.
Figure 10:
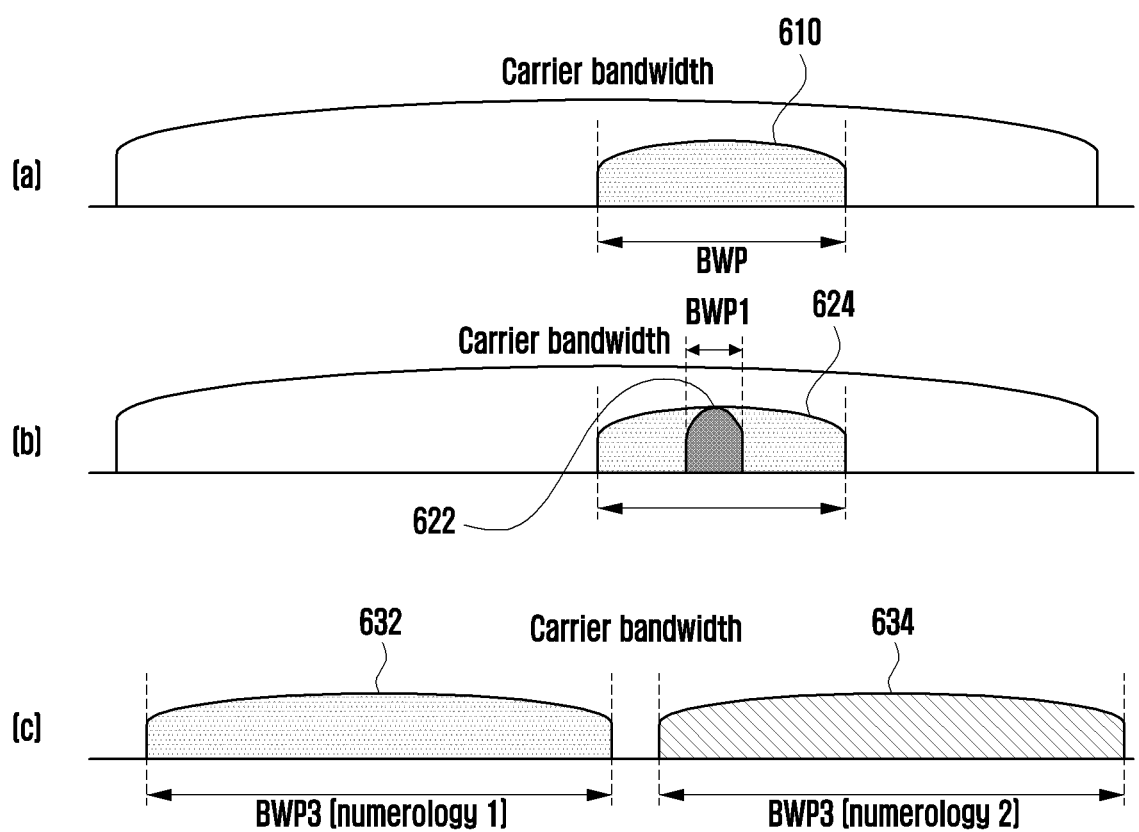

FIG. 1N is a diagram illustrating an example of the configuration of an NR-DC according to an embodiment of the disclosure.

As illustrated in the drawings, the radio access network of the next generation mobile communication system (new radio (NR)) may include a next generation base station (new radio node B (gNB)) 1m-10, 1m-30, 1n-10, and 1n 30, and an AMF (new radio core network) 1m-05, 1m-25, and 1n-05. A new radio user equipment (NR UE) (or a UE) 1m-15 and 1n-15 may access an external network via the gNB 1m-10 and 1n-10 and the AMF 1m-05 and 1n-05.

Referring to FIGS. 1C, 1M, and 1N, the situation in which a macro cell and a pico cell coexist may be considered. The macro cell is a cell controlled by a macro base station, and provides a service in a relatively large area. Conversely, the pico cell is a cell controlled by an SeNB, and generally provides a service in a narrower area than the macro cell. Although there is no rigorous standard to distinguish a macro cell and a pico cell, for example, it may be assumed that the area of a macro cell has a radius of about 500 m and the area of a pico cell has a radius of about tens of meters. In the embodiments, a pico cell and a small cell are interchangeably used. In this instance, the macro cell may be an LTE or NR base station (MeNB or MgNB), and the pico cell may be an NR or LTE base station (SeNB or SgNB). Particularly, a 5G base station that supports a pico cell may use a frequency band greater than or equal to 6 GHz.

The embodiments may take into consideration the situation in which a macro cell and a macro cell coexist. The macro cell is a cell controlled by a macro base station, and provides a service in a relatively large area. In this instance, the macro cell may include an LTE base station (MeNB) and an LTE base station (SeNB). According to another embodiment, the macro cell may include an LTE base station (MeNB) and an NR base station (SgNB). According to another embodiment, the macro cell may include an NR base station (MgNB) and an LTE base station (SeNB). According to another embodiment, the macro cell may include an NR base station (MgNB) and an NR base station (SgNB).

Both the 4G system (LTE) and the 5G system are based on an orthogonal frequency-division multiplexing (OFDM). In LTE, a subcarrier spacing (SCS) is fixed to be 15 kHz. However, in the 5G system, multiple subcarrier spacings (SCS), for example, 7.5 kHz, 15 kHz, 30 kHz, 60 kHz, 120 kHz, and the like, may be supported in order to provide various services (e.g., enhanced mobile broadband (eMBB), ultra-reliable low-latency communication (URLLC), massive machine type communications (mMTC), and the like) and to provide wireless communication in various frequency ranges (e.g., sub-6 GHz, above-6 GHz, and the like). Furthermore, the 5G system allows multiple SCSs to be time division multiplexed (TDM) or frequency division multiplexed (FDM) even in a single carrier. Also, the maximum bandwidth of a component carrier (CC) in LTE is assumed to be 20 MHz. However, the 5G system may consider the maximum bandwidth of a CC to be up to 1 GHz.

Therefore, in the case of the 5G system, radio resources having different SCSs may be FDM or TDM. In LTE, a subframe is assumed to be the base unit of scheduling. However, in the 5G system, a slot including 14 symbols may be assumed to be the base unit of scheduling. That is, in LTE, the absolute time of a subframe is always fixed to be 1 ms. However, in the 5G system, the length of a slot may vary depending on an SCS.

Particularly, the 3GPP defines a synchronous signal/ physical broadcast channel (SS/PBCH) block for a synchronous signal (SS) which is used for an initial access procedure. The SS/PBCH block may include at least a primary synchronous signal (PSS), a secondary synchronous signal (SSS), and a (PCBH). In the case of transmission of an SS/PBCH block, a PSS, an SSS, a PBCH are always transmitted in series. Also, the SCS of an SS/PBCH block may be one of 15 kHz, 30 kHz, 120 kHz, and 240 kHz, according to the frequency band. In details, transmission is performed based on an SCS of 15 kHz or 30 kHz in a sub-6 GHz frequency band, and transmission is performed based on one of 120 kHz or 240 kHz in an above-6 GHz frequency band. An SS/PBCH block, configured to have a single SCS for each frequency band by classifying the above-mentioned frequency band in detail, may be transmitted.

Also, multiple SS/PBCH blocks may be transmitted in a single operating band. This is to allow UEs showing different performances to coexist and operate in a system bandwidth. In this instance, although a system bandwidth increases, the location at which a UE receives an SS/PBCH block may be different depending on a network configuration. Also, the point in time at which an SS/PBCH block is transmitted may be different depending on a network configuration. The transmission interval of an SS/PBCH block may be irregular. In detail, information indicating the channel bandwidth of a system, such as a message provided below, is configured to provide an SCS value used in the corresponding channel bandwidth.

FIG. 1O is a diagram illustrating bandwidth adaptation according to an embodiment of the disclosure.

Figure 1P:
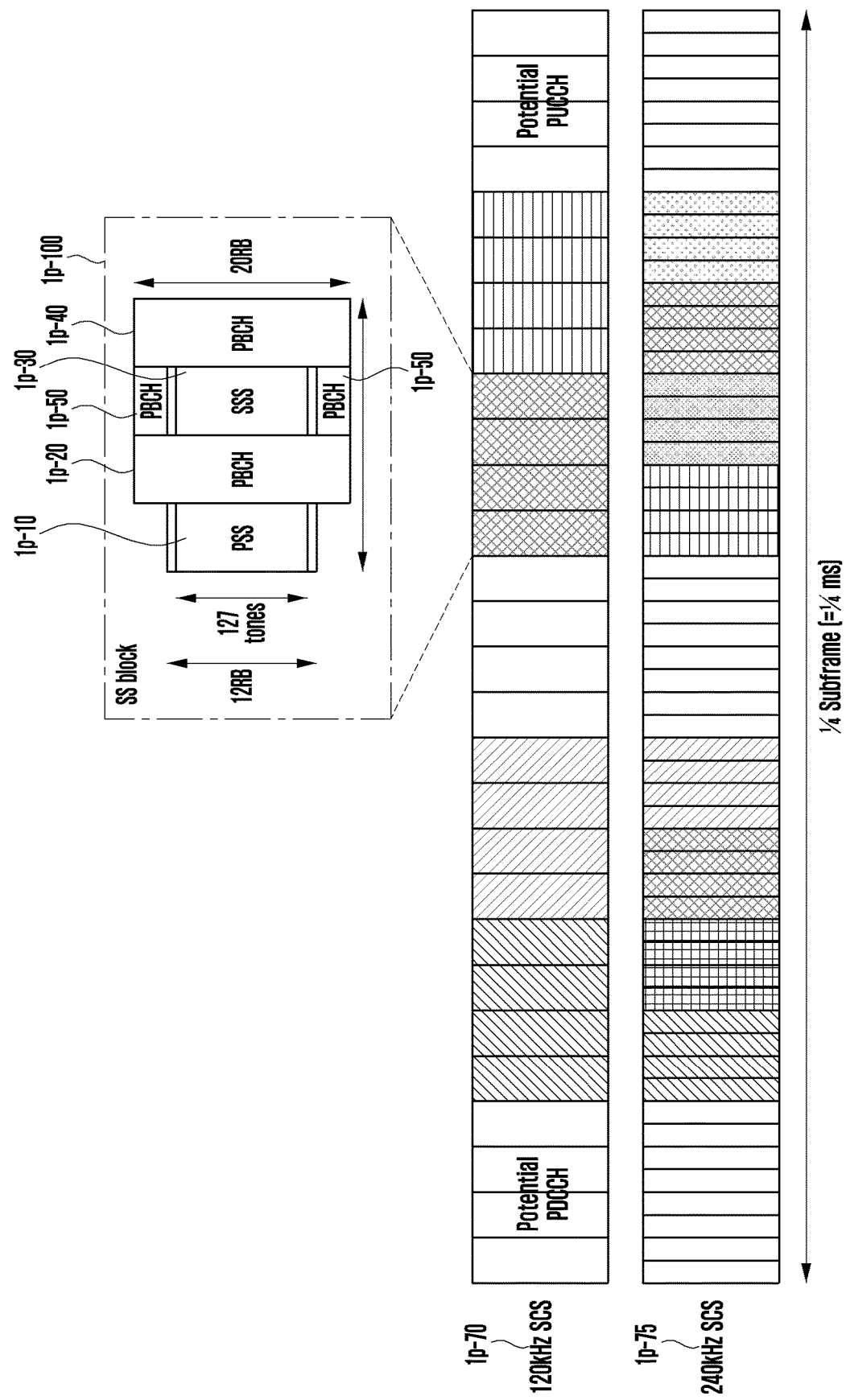
FIG. 1P is a diagram illustrating an example of a synchronous signal/physical broadcast channel (SS/PBCH) block according to an embodiment of the disclosure.
Figure 1Q:
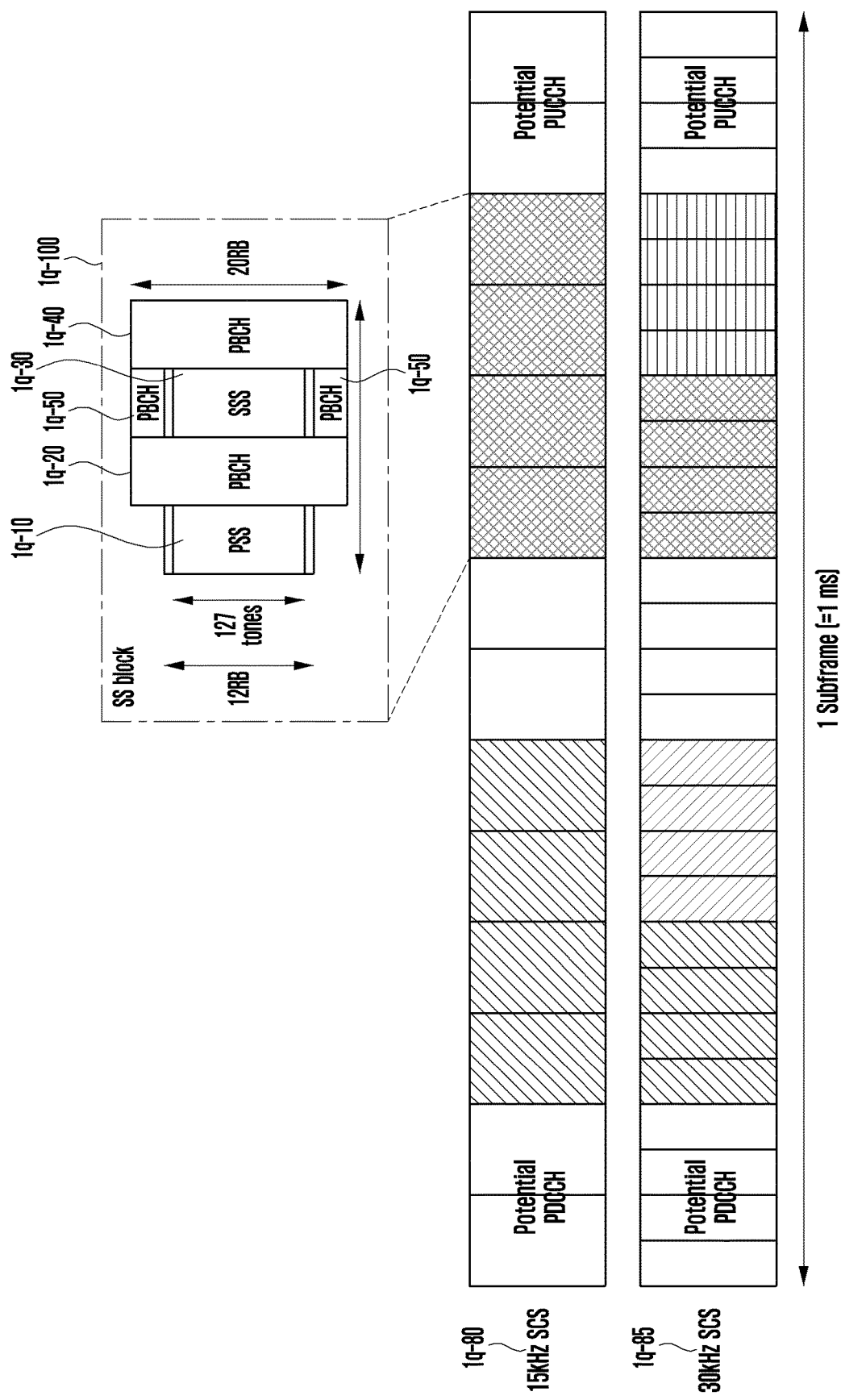
FIG. 1Q is a diagram illustrating an example of an SS/PBCH block according to an embodiment of the disclosure.
Figure 1R:
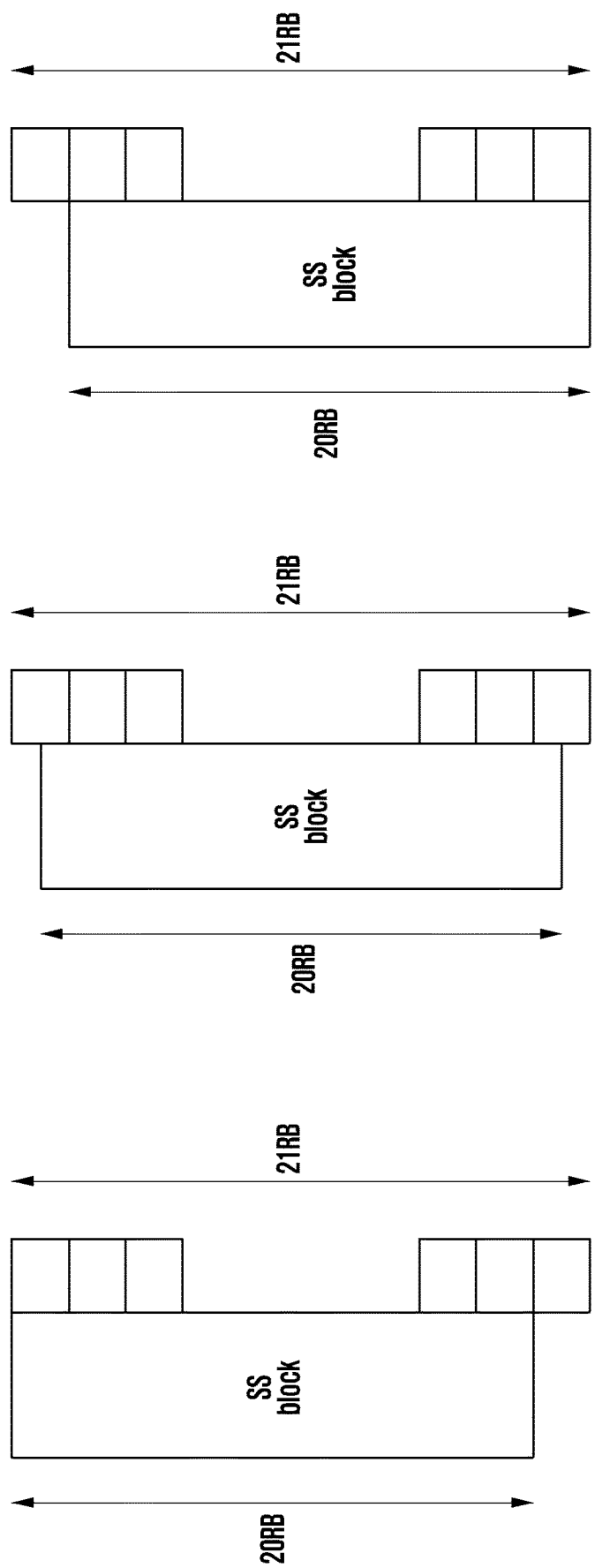
FIG. 1R is a diagram illustrating an example of a transmission method of an SS/PBCH block according to an embodiment of the disclosure.
Figure 1S:
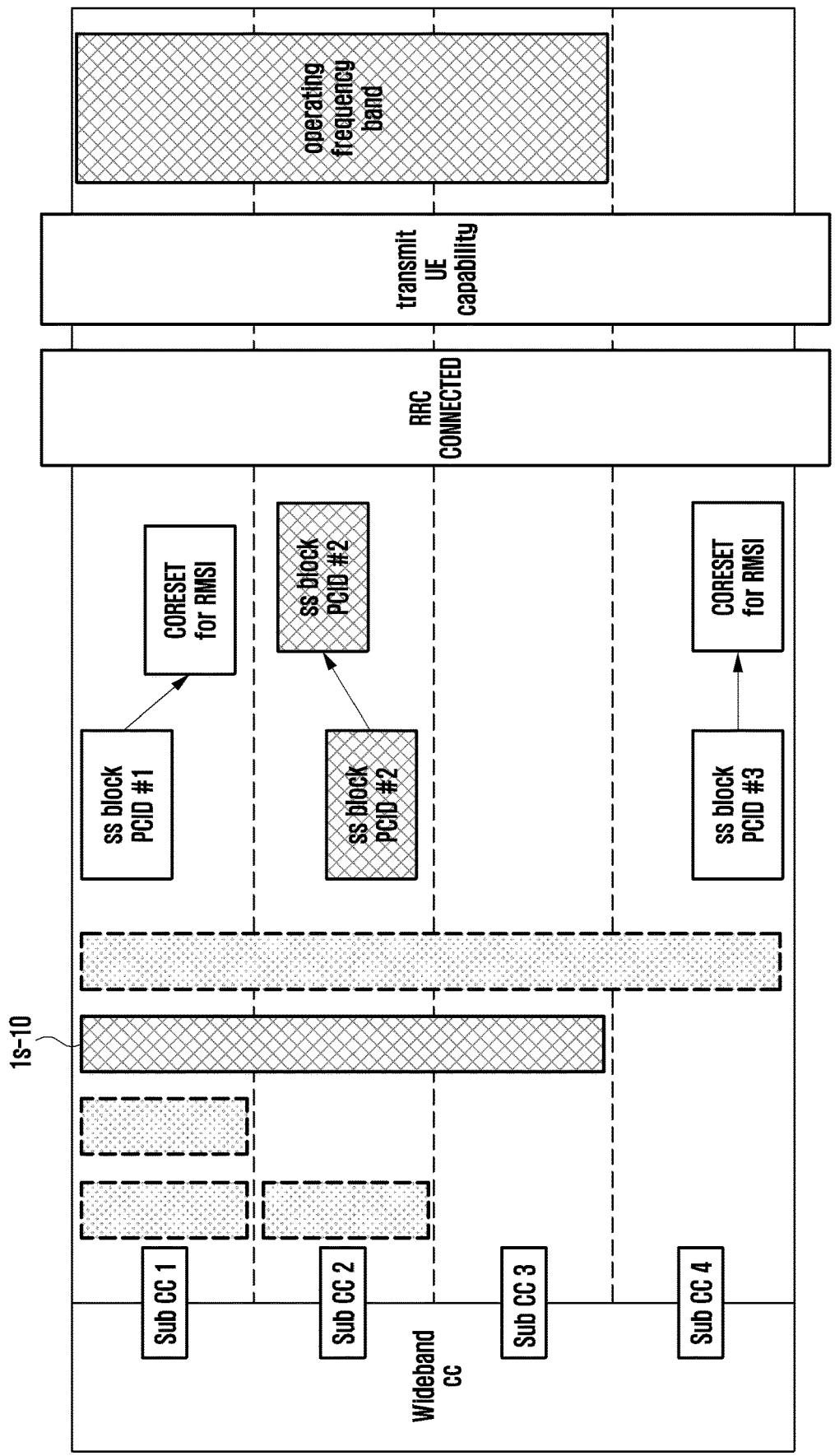
FIG. 1S is a diagram illustrating a frame structure according to an embodiment of the disclosure.
Figure 1T:
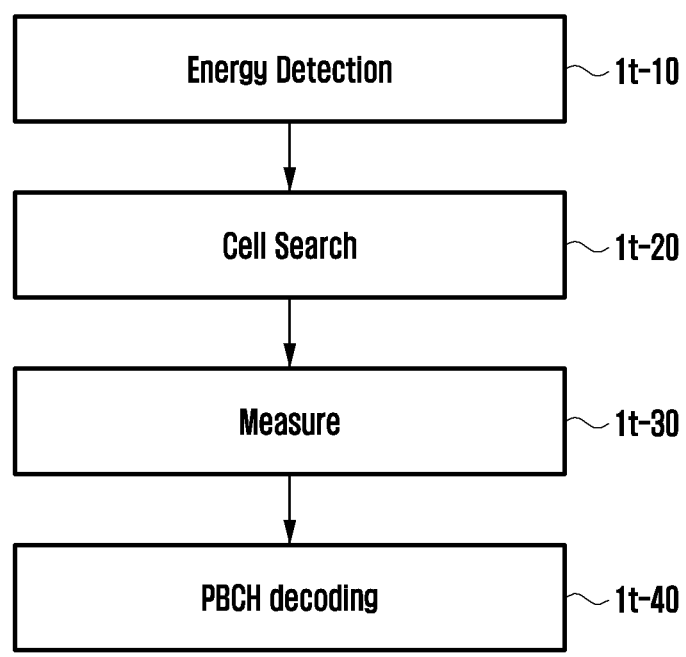
FIG. 1T is a diagram illustrating an example of an initial access procedure according to an embodiment of the disclosure.
Figure 1U:
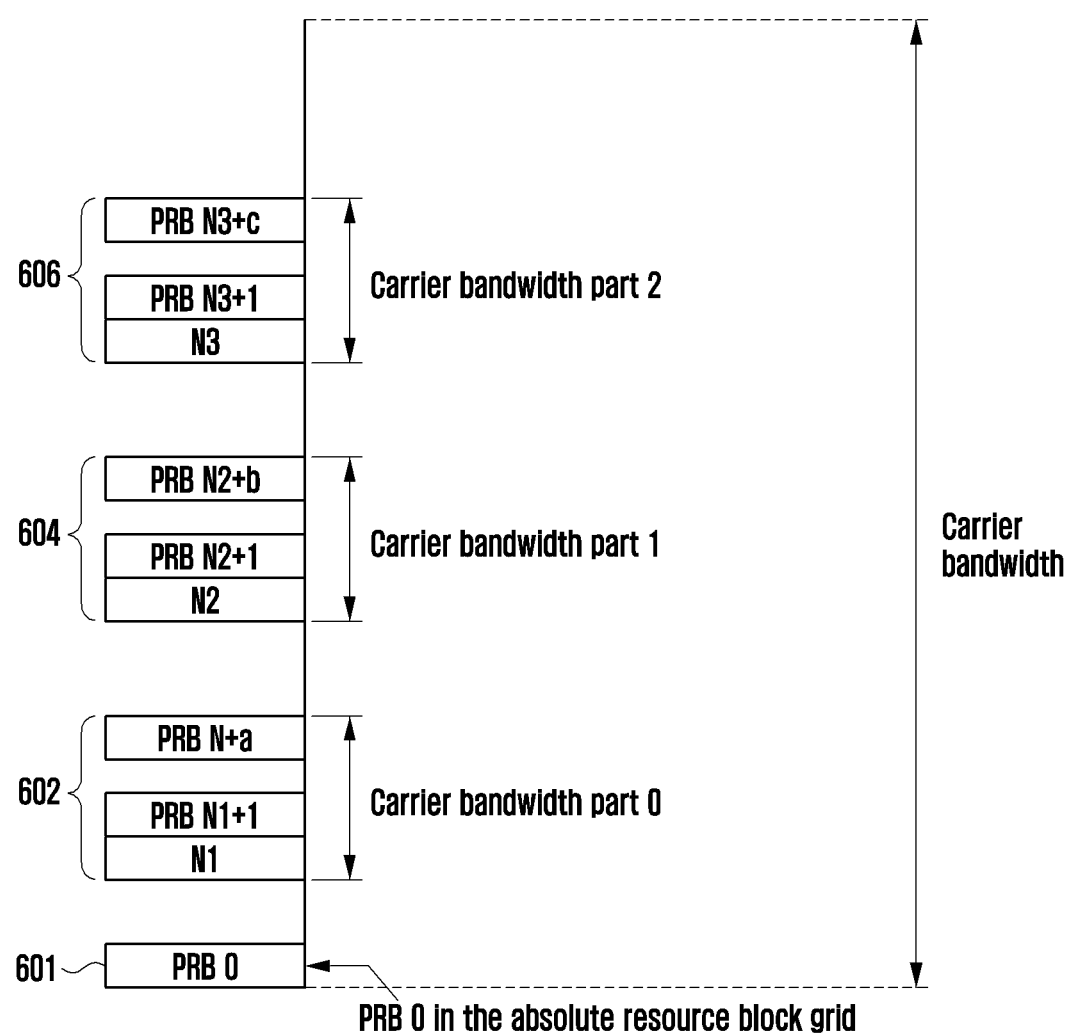
FIG. 1U is a diagram illustrating bandwidth adaptation according to an embodiment of the disclosure.

FIG. 1U is a diagram illustrating bandwidth adaptation according to an embodiment of the disclosure.

Referring to FIG. 1O, as shown in the diagrams a to c of FIG. 1O, a base station may provide information associated with a bandwidth part (BWP) associated with a carrier bandwidth. A UE may receive information associated with the BWP from the base station. According to various embodiments, the information associated with the BWP may include bandwidth part configuration information. According to an embodiment, the bandwidth part configuration information may include set values which are needed when a UE uses the bandwidth of a transmission signal as a bandwidth part. For example, the bandwidth part configuration information may include the frequency resource location of a BWP, the bandwidth of a frequency resource of a BWP, and numerology information associated with operation of a BWP. According to an embodiment, the numerology information of the BWP may include at least one among subcarrier spacing (SCS) information, the type of cyclic prefix of an orthogonal frequency division multiplexing (OFDM) (e.g., a normal cyclic prefix type or an extended cyclic prefix type), and the number of symbols included in a single slot (e.g., 7 symbols or 14 symbols). According to various embodiments, a UE may activate at least one BWP based on bandwidth part configuration information received from a base station, and may perform transmission or reception of a control signal or data based on the activated BWP.

Referring to the diagram a of FIG. 1O, a UE may receive bandwidth part configuration information associated with a single BWP 610 from a base station, and may activate the BWP 610 based on the bandwidth part configuration information associated with the BWP 610. According to an embodiment, the BWP 610 may be an operating band configured based on the RF performance of the UE.

Referring to the diagram b of FIG. 1O, a UE may receive bandwidth part configuration information associated with multiple BWPs (e.g., BWP1 622 and BWP2 624) from a base station. According to an embodiment, the multiple BWPs may include a BWP (e.g., the BWP1 622) associated with a basic operating band configured based on the RF performance of the UE, and in addition, may include a BWP (e.g., the BWP2 624) associated an additional operating band. According to various embodiments, one or more BWPs associated with an additional operating band may be used. According to various embodiments, a BWP associated with an additional operating band may be a BWP having a numerology characteristic different from that of the basic operating band. According to various embodiments, BWPs associated with at least two additional operating bands may be BWPs having different numerology characteristics. Based on the bandwidth part configuration information associated with the BWP1 622 and the bandwidth part configuration information associated with the BWP2 624, the UE may select and activate one of the BWP1 622 and the BWP2 624. According to an embodiment, the base station may select one of the BWP 1 622 and the BWP2 624, and may indicate activation of the selected BWP to the UE.

Referring to the diagram c of FIG. 1O, a UE may receive bandwidth part configuration information associated with multiple BWPs (e.g., BWP3 (numerology1) 632 and BWP3 (nemerology2) 634) having different numerology characteristics from a base station. According to an embodiment, multiple BWPs may include the BWP3 (numerology 1) 632 having a first numerology or the BWP3 (numerology2) 634 having a second numerology. The UE may select at least one of the BWP3 (numerology 1) 632 and the BWP3 (numerology 2) 634 based on numerology information included in the bandwidth part configuration information associated with the BWP3 (numerology 1) 632 and the bandwidth part configuration information associate with the BWP 3 (numerology 2) 634. For example, one of the BWP3 (numerology1) 632 and the BWP3 (numerology2) 634 may be selected and activated based at least one of subcarrier spacing (SCS) information, the type of cyclic prefix of an OFDM (e.g., a normal cyclic prefix type or an extended cyclic prefix type), and the number of symbols included in a single slot (e.g., 7 symbols or 14 symbols) among numerology information included in the bandwidth part configuration information associated with the BWP3 (numerology 1) 632 and the bandwidth part configuration information associated with the BWP3 (numerology 2) 634.

According to various embodiments, the UE may select a BWP to activate among multiple BWPs based on a radio resource control (RRC) signal received from the base station, or may select a BWP to activate based on information indicating whether to perform activation, included in at least one of the pieces of bandwidth part configuration information of the multiple BWPs. As another example, the UE may select a BWP to activate, based on a downlink control information received from the base station. As another example, the UE may select a BWP to activate, based on a MAC control element (MAC CE) received from the base station.

According to an embodiment, in the case in which an RRC signal is used, the base station may include information associated with a frequency resource allocated by a network or at least one BWP-related time information in an RRC signal, and may transmit the same. For example, the UE may select and activate one of the BWPs, based on the information associated with a frequency resource allocated by a network included in the RRC signal or based on the at least one BWP-related time information included in the RRC signal. For example, the at least one BWP-related time information may include a time pattern that changes a BWP. The time pattern may include operating slot information or subframe information of BWPs, or operating times designated for BWPs.

According to an embodiment, in the case in which bandwidth part configuration information is used, a bitmap indicating whether to perform activation may be included in the bandwidth part configuration information of BWPs. The UE may select a BWP to activate, based on the bitmap. For example, the value of the bitmap may be 0 or 1. 0 (or 1 or another designated value) may indicate activation, and 1 (or 0 or another designated value) may indicate deactivation. The UE may select a BWP to activate, according to bitmap values included in the bandwidth part configuration information of BWPs.

According to an embodiment, in the case in which download control information (DCI) is used, the base station may include information indicating activation of at least one BWP in the DCI. The UE may select one of the multiple BWPs to activate, based on the information included in the DCI. If the information included in the DCI is the same as a BWP (e.g., the BWP1 622) which is being activated, the UE may discard the DCI value. If the information included in the DCI is different from the BWP1 622 which is being activated, the UE may change the BWP1 622, which is being activated, to a BWP (e.g., the BWP2 624) corresponding to the information included in the DCI and may activate the same. For example, the UE may activate the BWP 2 612 a predetermined period of time (e.g., a time in slot units or a time in subframe units) after receiving the DCI.

According to an embodiment, in the case in which DCI is used, an index indicating whether to perform activation may be included in the bandwidth part configuration information of BWPs. The UE may select a BWP to activate, based on the index. According to an embodiment, the index of each BWP included in bandwidth part configuration may be included. For example, if DCI including the index of a BWP to be activated is received, the UE may activate the corresponding BWP, and may deactivate other BWPs.

According to an embodiment, in the case in which a MAC CE is used, the base station may include information indicating activation of at least one BWP in the MAC CE. The UE may select one of the multiple BWPs to activate, based on the information included in the MAC CE. If the information included in the MAC CE is the same as a BWP (e.g., the BWP1 610) which is being activated, the UE may discard the DCI value. If the information included in the MAC CE is different from the BWP1 610 which is being activated, the UE may change the BWP1 610, which is being activated, to a BWP (e.g., the BWP2 612) corresponding to the information included in the DCI and may activate the same. The UE may activate the BWP2 612 a predetermined period of time (e.g., a time in slot units or a time in subframe units) after receiving the MAC CE.

Referring to FIG. 1U, according to various embodiments, BWPs (e.g., carrier bandwidth part0, carrier bandwidth part1, or carrier bandwidth part2) may be allocated in a carrier bandwidth. According to an embodiment, BWPs may be allocated based on a physical resource block (hereinafter "PRB"), for example, PRB0 601, within a carrier bandwidth. A PRB is, for example, a designated bandwidth unit which a UE may use. According to an embodiment, multiple PRBs may be allocated to multiple BWPs. For example, multiple PRBs, such as PRBs N1 to N1+a 602, may be allocated in carrier bandwidth part0, and multiple PRBs, such as PRBs N2 to N2+b 604, may be allocated in carrier bandwidth part 1, and multiple PRBs, such as PRBs N3 to N3+c 606, may be allocated in carrier bandwidth part 3. For example, N1, N2, or N3 may be an initial PRB, and a, b, and c, which are the number of bandwidths of a BWP, may be the number of PRBs.

According to various embodiments, the UE may use bandwidths corresponding to the entirety of a BWP, or may use a bandwidth which corresponds to at least one PRB in a BWP.

FIG. 1P is a diagram illustrating an example of an SS/PBCH block according to an embodiment of the disclosure.

FIG. 1Q is a diagram illustrating an example of an SS/PBCH block according to an embodiment of the disclosure.

FIG. 1R is a diagram illustrating an example of a method of transmitting an SS/PBCH block according to an embodiment of the disclosure.

Referring to FIG. 1P, one or more SS/PBCH blocks 1p-100 may be included in a frequency bandwidth (wide bandwidth CC) in a 5G system defined by the 3GPP. The SS/PBCH block may be transmitted, including PBCHs 1p-20, 1p-40, and 1p-50 in addition to a PSS 1p-10/SSS1p-30.

The SS/PBCH block may be transmitted according to the structures illustrated in FIGS. 1P and 1Q. A PSS 1p-10 and 1q-10, a first PBCH (1st PBCH) 1p-20 and 1q-20, an SSS 1p-30 and 1q-30, and a second PBCH (2nd PBCH) 1p-40 and 1q-40 are transmitted in different symbols. In terms of a frequency, 20 RB may be used for transmission of the SS/PBCH block 1p-100 and 1q-100. Also, a few PBCHs 1p-50 and 1q-50 may be transmitted in a symbol in which the SSS 1p-30 and 1q-30 is transmitted. Also, the center of the PSS 1p-10 and 1q-10, the SSS 1p-30 and 1q-30, the PBCHs 1p-20, 1p-40, 1p-50, 1q-20, 1q-40, and 1q-50 may be aligned.

Referring to FIG. 1R, in the case of SS/PBCH block transmission in the 3GPP, transmission may not be performed according to a resource block grid (RB grid), but transmission may be performed according to an OFDM subcarrier gird including an offset. In this instance, the applied offset value of the sub-carrier gird may be informed by a PBCH.

Referring again to FIGS. 1P and 1Q, a candidate location, in which the SS/PBCH block 1p-100 configured with four symbols may be transmitted, may be determined within two consecutive slots (each including 14 symbols) at 120 kHz, as illustrated in the diagram 1p-70. For reference, a single slot may include 14 symbols according to the 3GPP. Alternatively, a single slot may include seven symbols. As illustrated in the diagram 1p-75 of FIG. 1P, a candidate location, in which the SS/PBCH block 1p-100 configured with four symbols may be transmitted, may be determined in four consecutive slots (each including 14 symbols) at 240 kHz. According to an embodiment, based on the alignment in the slots of FIG. 1P, candidate locations for transmission of a total of 64 SS/PBCH blocks 1p-100 at above 6 (240 kHz) may be determined.

The transmission pattern of the SS/PBCH block 1p-100 in the time axis may be repeated according to a predetermined cycle. In association with the transmission pattern in the time axis, the 3GPP determines candidate locations for transmission of the SS/PBCH blocks 1p-100 within a slot, and a maximum of 64 SS/PBCH blocks 1p-100 (above 6 GHz, 8 for below 6, 4 for below 3) may be transmitted within an initial 5 ms. A network may determine an actual transmission pattern among the candidate locations. The pattern may be repeated according to a cycle of 5, 10, ..., 160 ms, which may be determined by a base station. In this instance, a UE may basically consider the repeat cycle of the pattern to be 20 ms, and perform an initial access procedure.

In below 6, candidate locations in which the SS/PBCH blocks 1q-100 may be transmitted may be as illustrated in FIG. 1Q. In the case of 15 kHz, locations for transmission of two SS/PBCH blocks 1q-100 may be determined within a single slot (14 symbols) as illustrated in the diagram 1q-80. In the case of 30 kHz, locations for transmission of four SS/PBCH blocks 1q-100 may be determined within two consecutive slots (14 symbols) as illustrated in the diagram 1q-85.

The transmission pattern of the SS/PBCH block 600 in the time axis may be repeated according to a predetermined cycle. In association with the transmission pattern in the time axis, the 3GPP determines candidate locations for transmission of the SS/PBCH block 1p-100 or 1q-100 within a slot, and a maximum of 8 SS/PBCH blocks (above 6 GHz, 8 for below 6, 4 for below 3) may be transmitted within an initial 5 ms. A network may determine an actual transmission pattern among the candidate locations. The pattern may be repeated according to a cycle of 5, 10, ..., 160 ms, which may be determined by a base station. In this instance, a UE may basically consider the repeat cycle of the pattern to be 20 ms, and may perform an initial access procedure.

A plurality of SS/PBCH blocks may be transmitted in the frequency axis within a frequency band that a single base station operates. In this instance, the location of a frequency at which an SS/PBCH block is transmitted may be determined by a network, and a UE may detect the frequency using an SS/PBCH block detection interval defined according to the standard.

In the 5G system, at least one cell may exist in a frequency band that a single base station operates. From the perspective of a UE, a single cell may be associated with a single SS/PBCH block. The SS/PBCH block may be referred to as an SS/PBCH block associated with a cell, an SS/PBCH block that defines a cell, a cell defining SS/PBCH block, and the like, but is not limited to the terms. That is, if DL/UL sync and RRC connection/NAS connection are completed based on an SS/PBCH block detected while the UE detects the frequency, the SS/PBCH block for a corresponding cell is considered to be a cell defining SS/PBCH block.

FIG. 1S is a diagram illustrating a frame structure according to an embodiment of the disclosure.

Referring to FIG. 1S, a plurality of sub-operating frequency bands (hereinafter, sub CCs) may be included in a system frequency band (wideband CC) of a base station. For example, four examples of sub-operating frequency bands, such as sub CC1, sub CC2, sub CC3, and sub CC4, are illustrated. The disclosure is not limited to the same, but three or fewer, or five or more, sub-operating frequency bands may be included in the operating frequency band of the base station. The sub-operating frequency band is used for ease of description of the disclosure, but actually, the sub-operating frequency band may not be logically or physically divided according to the standard or in the implementation.

Radio Frequency (RF) capability 1s-10, which is included in the UE capability, may refer to a bandwidth (BW) that a UE is capable of supporting using a single RF. In FIG. 1S, a UE (target UE), which supports three consecutive CCs (sub CC1, sub CC2, and sub CC3) using a single RF, is assumed. Accordingly, the operating frequency band of the UE may be a frequency band including sub CC1, sub CC2, and sub CC3.

In the example of FIG. 1S, it is assumed that SS/PBCH blocks are on sub CC1, sub CC2, and sub CC4. It is also assumed that the SS/PBCH block on sub CC2 is the cell defining SS block of the target UE. In the example of FIG. 1S, a base station may indicate, to a UE, measuring the SS/PBCH block on sub CC1 or sub CC4. In this instance, the base station may use a method of informing the UE of the frequency value (NR absolute radio-frequency channel number (NR ARFCN)) of the corresponding SS/PBCH block via a configuration message for measurement.

Referring to FIG. 1S, physical cell identity (PCID) #1, PCID #2, PCID #3 of the SS/PBCH blocks respectively being on sub CC1, sub CC2, and sub CC4 may be the same value or may be different values from each other. Also, at least two PCIDs may be the same. For example, PCID #1 and PCID #2 of SS/PBCH block 1 and SS/PBCH block 2, which are on consecutive sub CC1 and sub CC2, may have the same value, and PCID #3 of SS/PBCH block 3 on sub CC4 may have a different value from the others.

FIG. 1T is a diagram illustrating an example of an initial access procedure according to an embodiment of the disclosure.

The initial access procedure may be performed in the process in which a UE camps on a cell for the first time when the UE is powered on. The initial access procedure may be performed when a public land mobile network (PLMN) is changed. The initial access procedure may be performed when a UE misses a network, and camps on a cell again. The initial access procedure may be performed when a UE in the idle state moves and camps on a cell in an area where the UE moves to. The initial access procedure may be performed when a UE in the connected state camps on a cell existing around the UE according to an instruction from a base station or according to a decision made by the UE.

The initial access procedure of a UE will be described with reference to the system that the description of FIG. 1S assumes. This is a description of one of the various probable scenarios, but the disclosure is not limited thereto.

Referring to FIG. 1T, a UE may perform energy detection and may search for an SS/PBCH block in operation 1t-10. The UE may detect an SS/PBCH block in a carrier frequency band using synchronization signal raster (SS raster) information. In this instance, the SS raster information may be information indicating the location from which a synchronization signal may be detected, for example, a global synchronization channel number (GSCN), an NR ARFCN, or the like. Accordingly, the UE in the scenario of FIG. 1S may detect a PSS and an SSS on sub CC2.

According to an embodiment, the UE may detect a plurality of SS/PBCH blocks included in a band, based on a PSS sequence, and selects one of the plurality of detected SS/PBCH blocks. The information associated with the plurality of detected SS/PBCH blocks may be used for a measurement operation.

According to an embodiment, the UE may select an SS/PBCH block having the highest correlation peak value. Alternatively, the UE may select an SS/PBCH block having the highest signal to noise ratio (SNR)/received signal strength indicator (RSSI).

If SS/PBCH blocks are transmitted via multiple beams, the UE may select one of the SS/PBCH blocks received via a reception beam (Rx beam) of the UE.

In operation 1*t*-20, the UE may perform cell search. The UE may identify whether a cell exists, which is mapped to the PSS and SSS detected in operation 1*t*-10, using the known PSS and SSS sequence. Through the above, the PCID of the corresponding cell may be detected. Also, in parallel with the process, or before or after the process, a downlink synchronization (DL sync) may be performed.

In operation 1*t*-30, the UE may perform measurement. The UE may calculate or measure a quality based on the reference signal receive power (RSRP) of a PBCH demodulation reference signal (DMRS) identified based on the determined PCID, the RSRP calculated using the SSS included in the selected SS/PBCH block, and the like. The process may be performed before operation 1*t*-20, in parallel with operation 1*t*-20, or after operation 1*t*-20.

In operation 1*t*-40, the UE may perform decoding of the PBCH and the PSS/SSS included in the SS/PBCH block detected in operation 1*t*-20. According to the scenario of FIG. 1S, the UE may perform decoding of the PBCH and the PSS/SSS included in the SS/PBCH block on sub CC 2.

The UE may obtain CORESET information related to remaining minimum system information (RMSI) from the PBCH. The UE may decode the CORESET related to the RMSI, based on the obtained information, so as to obtain RMSI data. The UE may obtain RACH configuration information from the RMSI. The UE may proceed with a RACH procedure based on the RACH configuration information obtained from the RMSI. If the UE obtains an RRC configuration message from MSG 4 during the RACH procedure, the RRC state of the UE may be changed to an RRC_CONNECTED state.

The UE may identify a temporal location at which the network actually transmits the SS/PBCH block, the temporal location being included in the RRC configuration message.

The UE which is changed to the RRC_CONNECTED state may transmit UE capability information. The UE capability of the UE may include information associated with a bandwidth and a band in which the UE is operable. Also, the UE capability may include a time needed when the UE processes received data. In detail, time information associated with a time needed when the UE processes scheduling information received for uplink data, and transmits the uplink data based on the same may be included. Also, the UE capability may include a time needed when the UE processes received downlink data and transmits an ACK/NACK for the downlink data based on the same. In addition, the UE capability may include information associated with a combination of bands of which carrier aggregation is allowed. Subsequently, via an RRC reconfiguration message, an operating bandwidth appropriate for a UE RF capability may be configured to be the operating bandwidth of the UE. For example, with reference to the scenario of FIG. 1S, sub CC1 to sub CC3 may be configured to be the operating bandwidth of the UE.

Via the RRC reconfiguration message, one or more bandwidth parts may be configured (at least one BWP is configured within a band including sub CC 1 to sub CC3 of the scenario of FIG. 1S). The UE may receive the RRC reconfiguration message including information associated with a neighboring cell to measure, for example, at least one of the frequency and time information related to an CSI-RS and an SS/PBCH block.

FIG. 1D is a diagram illustrating the structure of a radio protocol of a next generation mobile communication system according to an embodiment of the disclosure.

Referring to FIG. 1D, the radio protocol of the next generation mobile communication system may include an NR service data adaptation protocol (SDAP) 1*d*-01 and 1*d*-45, an NR PDCP 1*d*-05 and 1*d*-40, an NR RLC 1*d*-10 and 1*d*-35, and an NR MAC 1*d*-15 and 1*d*-30 for each of a UE and an NR gNB.

The main functions of the NR SDAP 1*d*-01 and 1*d*-45 may include some of the following functions.
- transfer of user data (transfer of user plane data)
- mapping between a QoS flow and a data bearer (DRB) for both an uplink and a downlink
- marking a QoS flow ID in an uplink and a downlink (marking a QoS flow ID in both downlink (DL) and uplink (UL) packets)
- reflective QoS flow to DRB mapping for uplink SDAP PDUs In association with an SDAP layer device, whether to use the header of the SDAP layer device or whether to use the function of the SDAP layer device may be configured for the UE via an RRC message for each PDCP layer device, for each bearer, or for each logical channel. If the SDAP header is configured, a NAS reflective QoS configuration one-bit indicator and an AS reflective QoS configuration one-bit indicator of the SDAP header may provide an indication so that the UE updates or reconfigures mapping information between a QoS flow and a data bearer in an uplink and a downlink. The SDAP header may include QoS flow ID information indicating QoS. The QoS information may be used as data processing priority information, scheduling information, or the like for supporting a smooth service.

The main functions of the NR PDCP 1*d*-05 and 1*d*-40 may include some of the following functions.
- header compression and decompression: ROHC only
- transfer of user data
- sequential transfer (in-sequence delivery of upper layer PDUs)
- not sequential transfer (out-of-sequence delivery of upper layer PDUs)
- reordering (PDCP PDU reordering for reception)
- duplicate detection (duplicate detection of lower layer SDUs)
- retransmission (retransmission of PDCP SDUs)
- ciphering and deciphering
- timer-based SDU discard (timer-based SDU discard in uplink)

The reordering function of the NR PDCP device may refer to a function of sequentially reordering PDCP PDUs received from a lower layer according to a PDCP sequence number (SN), and may include a function of transferring sequentially reordered data to a higher layer, a function of immediately transferring data irrespective of a sequence, a function of recording lost PDCP PDUs after sequential recording, a function of reporting the states of lost PDCP PDUs to a transmission side, and a function of requesting retransmission of lost PDCP PDUs.

The main functions of the NR RLC 1*d*-10 and 1*d*-35 may include some of the following functions.
- transfer of data (transfer of upper layer PDUs)
- sequential transfer (in-sequence delivery of upper layer PDUs)
- not sequential transfer (out-of-sequence delivery of upper layer PDUs)
- ARQ (error correcting via ARQ)
- concatenation, segmentation, and reassembly (concatenation, segmentation and reassembly of RLC SDUs)
- re-segmentation (re-segmentation of RLC data PDUs)
- reordering (reordering of RLC data PDUs)
- duplicate detection
- error detection (protocol error detection)

RLC SDU discard
RLC re-establishment

The mentioned in-sequence delivery function of the NR RLC device is a function of sequentially transferring RLC SDUs, received from a lower layer, to a higher layer. If a single original RLC SDU is divided into multiple RLC SDUs and the multiple RLC SDUs are received, the in-sequence delivery function may include a function of re-establishing and transferring the same. The in-sequence delivery function may include a function of reordering received RLC PDUs according to an RLC sequence number (SN) or a PDCP SN, and a function of recording lost RLC PDUs after sequential reordering. The in-sequence delivery function may include a function of reporting the states of lost RLC PDUs to a transmission side and a function of requesting retransmission of lost RLC PDUs. The in-sequence delivery function may include a function of sequentially transferring only RLC SDUs before a lost RLC SDU, to a higher layer, if a lost RLC SDU exists. The in-sequence delivery function may include a function of sequentially transferring all RLC SDUs, received before a predetermined timer starts, to a higher layer even though a lost RLC SDU exists, if the predetermined timer expires. Alternatively, the in-sequence delivery function may include a function of sequentially transferring all RLC SDUs, received up to the present, to a higher layer even though a lost RLC SDU exists, if a predetermined timer expires. Also, RLC PDUs are processed in order of reception (in order or arrival, irrespective of a serial number or a sequence number), and are transmitted to the PDCP device irrespective of a sequence (out-of-sequence delivery). In the case of segments, segments, which are stored in a buffer or which are to be received in the future, are received and reconfigured as a single intact RLC PDU, are processed, and are transmitted to the PDCP device. The NR RLC layer may not include a concatenation function. In addition, the concatenation function may be performed in the NR MAC layer or may be replaced with a multiplexing function in the NR MAC layer.

The above-mentioned out-of-sequence delivery function of the NR RLC device is a function of transferring RLC SDUs, received from a lower layer, to a higher layer irrespective of a sequence. In the case in which a single original RLC SDU is divided into multiple RLC SDUs and the multiple RLC SDUs are received, the out-of-sequence delivery function may include a function of re-establishing and transmitting the same, and a function of storing the RLC SN or PDCP SN of received RLC PDUs, sequentially ordering the same, and recording lost RLC PDUs.

The NR MAC 1d-15 and 1d-30 may be connected to multiple NR RLC layer devices configured for a single UE, and the main functions of the NR MAC may include some of the following functions.

mapping (mapping between logical channels and transport channels)
multiplexing and demultiplexing (multiplexing/demultiplexing of MAC SDUs)
scheduling information reporting
HARQ (error correcting via HARQ)
priority handling between logical channels (priority handling between logical channels of one UE)
priority handling between UEs (priority handling between UEs by means of dynamic scheduling)
MBMS service identification
transport format selection
padding The NR PHY layer 1d-20 and 1d-25 may perform channel-coding and modulating of higher layer data to generate an OFDM symbol and may transmit the OFDM symbol via a wireless channel, or may perform demodulating and channel-decoding of an OFDM symbol, received via a wireless channel, and may transmit the demodulated and channel-decoded OFDM symbol to a higher layer.

FIG. 1E is a diagram illustrating a structure in the frequency axis and a resource transferring method in an LTE system and an NR system according to an embodiment of the disclosure.

Referring to 1E, LTE uses orthogonal frequency division multiple access (OFDMA) and single carrier frequency division multiple access (SC-FDMA), and thus, the space is divided by the frequency axis and the time axis in LTE. The minimum unit of the division is referred to as a resource element (RE). A total of 84 REs, that is, 12 subcarriers in the frequency axis and 7 OFDM symbols in the time axis, may be referred to as a single resource block (RB). A single subcarrier is 15 kHz in LTE, and thus, a single RB is 180 kHz. In the case of a downlink, if a direct carrier (DC) subcarrier, which is at the center of the frequency, is used, an interference level may disproportionally increase due to local-oscillator leakage. To solve the drawback, in the case of an LTE downlink 1e-05, a NULL signal is transmitted on a DC carrier. In the case of a carrier in an uplink 1e-10, transmission is performed by shifting the frequency by 7.5 kHz (½ SCS).

In the NR system, based on the fact that the problem can be solved in the implementation, resource transmission is performed based on a basic center frequency without applying DC carrier NULL transmission in the downlink and frequency shifting in the uplink. That is, signal transmission is performed on the downlink DC carrier and 7.5 kHz shifting is not applied in the uplink as shown in the diagram 1e-20. Also, it is agreed to use an OFDMA scheme, in addition to SC-FDMA, in the uplink in the NR system, as shown in the diagram 1e-25.

In the disclosure, there is provided a description associated with the case in which an LTE cell and an NR cell operate simultaneously in a predetermined frequency band, based on the fact that the uplink resource transmission structure of the LTE system and the uplink resource transmission structure of the NR system are different from each other, which has been described in FIG. 1E. That is, the case of coexistence of LTE and NR is used in a predetermined band.

Currently, spectrum sharing between an NR cell and an LTE cell is used in a supplementary uplink (SUL) band and a frequency division duplex (FDD) band. In the case of a UE, it is specified that supporting uplink 7.5 kHz frequency shifting for the SUL band and the FDD band is mandatory. The frequency band used in the NR cell is relatively higher than that of the LTE cell, and thus, the uplink coverage of the NR cell may be smaller than the downlink coverage. To solve the drawback, the NR cell is configured to configure, for a UL, a frequency band, which is lower than the used frequency band, and the frequency band is referred to as the SUL band. According to an embodiment, the SUL band may overlap the UL band used in LTE. That is, in the SUL band, NR and LTE need to operate simultaneously. A UE needs to mandatorily support 7.5 kHz frequency shifting so that the band that supports the same is also capable of operating as LTE uplink. Also, in the FDD band, the UE needs to mandatorily support uplink 7.5 kHz frequency shifting for a frequency band defined in table, currently defined according to Rel-15 as below. In other words, in the FDD band below, co-existence between LTE and NR is supported.

TABLE 5.2-1

NR operating bands in FR1

| NR operating band | Uplink (UL) operating band BS receive/UE transmit $F_{UL\_low}$-$F_{UL\_high}$ | Downlink (DL) operating band BS transmit/UE receive $F_{DL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n50 | 1432 MHz-1517 MHz | 1432 MHz-1517 MHz | TDD[1] |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4405 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |

NOTE 1
UE that complies with the NR Band n50 minimum requirements in this specification shall also comply with the NR Band n51 minimum requirements.

As described above, currently, co-existence of LTE and NR in a TDD band is not supported in Rel-15 NR system. Accordingly, In the TDD band (e.g., n41: uplink 2496 MHz to 2690 MHz, downlink 2496 MHz to 2690 MHz), a UE does not support uplink 7.5 kHz frequency shifting.

However, for a future NR system, there may be a desire for co-existence of LTE and NR even in the TDD band. Therefore, the drawback needs to be overcome. To support coexistence of LTE and NR, there may be drawbacks as follows.

1. From the perspective of implementation, if 7.5 kHz frequency shifting is applied in a TDD band, an operating of returning to the original frequency needs to be performed in a DL transmission slot. In this instance, a UE needs to dynamically apply 7.5 kHz frequency shifting depending on whether it is UL or DL in the TDD band.

2. If a UE (e.g., including a Rel-15 UE) that does not support 7.5 kHz frequency shifting accesses a corresponding cell, and a UE (e.g., including a Rel-16 UE) that supports 7.5 kHz frequency shifting also accesses the corresponding cell, uplink transmission of the different UEs may cause interference. Therefore, the situation in which two UEs having different capabilities perform uplink transmission within a single cell needs to be prevented.

3. If all UEs are allowed to mandatorily support 7.5 kHz frequency shifting even for TDD, existing NR Rel-15 UEs need to be implemented to include the new function, which is a drawback (non-backward compatible issue).

The disclosure provides a method of supporting co-existence of LTE and NR in a TDD band, without a compatibility problem, in the existing NR system, by taking into consideration the above-mentioned problems.

FIG. 1FA is a diagram illustrating an initial cell access process in an NR system according to an embodiment of the disclosure.

A UE 1fa-05 is a UE that is capable of connecting to an NR cell 1fa-10. The UE 1fa-05 receives system information block 1 (SIB1) from a predetermined NR cell via an initial cell search as described with reference to FIG. 1T, in operation 1fa-15, and identifies whether the corresponding cell is a home public land mobile network (HPLMN). Via the system information, the SIB1, a PLMN list is provided. The PLMN list is included in CellAccessRelatedInfo. Also, via the SIB1, a serving cell configuration (e.g., servingCell-ConfigCommonSIB) is provided, and thus, uplink/downlink default configuration information may be provided. According to an embodiment, in the uplink configuration information, an indicator (e.g., frequency Shift7p5khz) that indicates whether to perform 7.5 kHz frequency shifting for transmission in an uplink included in a corresponding band may be configured in FrequencyInfoUL-SIB, together with uplink frequency information and the like. If frequencyShift7p5khz is set to "true", when the UE performs uplink transmission in the corresponding cell, the UE may shift a frequency band by 7.5 kHz based on an indicated frequency, and may perform resource transmission. This means that the corresponding cell performs co-existence operation with LTE. Even though the UE is an NR UE, the UE may adjust an uplink operating frequency band to be appropriate for LTE in order to remove interference caused by a UE operating as an LTE cell in the corresponding cell. If the corresponding uplink is an SUL or a defined FDD band, since the UE is designed to be physically capable of performing 7.5 kHz shifting in the corresponding band, the UE may perform subsequent operations without any problem. However, if the corresponding band is a TDD band, a UE which is not capable of implementing 7.5 kHz shifting may not support the same and thus, interference necessarily occurs.

According to an embodiment, in order to overcome the drawback, cell access by a UE that does not support uplink 7.5 kHz frequency shifting in the TDD band, may be blocked. A UE may determine whether access to the corresponding band is allowed, may abandon access, and may perform cell selection to select another cell. The UE determines whether access to the corresponding band is allowed based on at least one of the criteria, including identifying whether the corresponding band operates according to TDD or FDD, whether the corresponding band operates as an SUL band, whether the corresponding band supports coexistence of LTE and NR, whether 7.5 kHz frequency shifting is needed for an uplink of the corresponding band, whether the UE supports 7.5 kHz frequency shifting for an uplink, or whether the UE supports 7.5 kHz frequency shifting for the uplink of the corresponding band.

Upon reception of the system information, the UE may select a PLMN, may camp on the selected PLMN in operation 1*fa*-20, and may receive other system information in operation 1*fa*-25. The method of determining the PLMN may be determined based on a predetermined priority of a PLMN. The predetermined priority of a PLMN may be stored in advance in a subscriber identification module (SIM) card or the UE. Subsequently, the UE performs a connection to the corresponding cell by reason that the UE needs to perform data transmission or reception or the like. That is, the UE transfers an RRCSetupRequest message for requesting connection to the corresponding cell in operation 1*fa*-30, and receives an RRCSetup message from a gNB in operation 1*fa*-35, and thus, the UE may receive a grant of connection to the corresponding cell. The UE that receives the same may transfer an RRCSetupComplete message including information associated with the UE in operation 1*fa*-45, and thus, the UE may complete a procedure for performing a connection service from a cell. Subsequently, after performing a UE capability transfer procedure in operations 1*fa*-50 and 1*fa*-55, a security establishment procedure, and the like, the UE receives an RRCReconfiguration message in operation 1*fa*-60, and performs uplink/downlink data communication in operation 1*fa*-65.

FIG. 1FB is a diagram illustrating an initial cell access process (additional solution) for a TDD cell that supports 7.5 kHz frequency shifting in an NR system, according to an embodiment of the disclosure.

Referring to FIG. 1FB, a procedure for supporting dynamic spectrum sharing (DSS) between LTE and NR in a predetermined TDD band, in addition to an N41 band, may be needed. The procedure may be performed with reference to an existing procedure performed in FDD, that is, a procedure that identifies whether uplink 7.5 kHz frequency shifting is supported based on SIB1, and applies the same. However, uplink 7.5 kHz frequency shifting in a TDD band is not currently supported, and thus, if the procedure is applied to the TDD band, a backward compatibility problem may occur.

Particularly, referring to the drawing, DSS is applied to a predetermined TDD band, and legacy UEs need to be barred from camping on and accessing the predetermined TDD band to which DSS is applied. In the existing NR system, if a cellBarred field of a master information block (MIB) is set to "barred", camp-on and access to the corresponding cell is not performed. According to the method provided in the drawing, although the cellBarred field of the MIB is set to "barred", a UE that is capable of performing DSS in the predetermined TDD identifies band information (indicating whether the corresponding band is a TDD band) and information whether to apply uplink 7.5 kHz frequency shifting, which are provided via the SIB1, and determines that the corresponding cell is not barred if uplink 7.5 kHz frequency shifting in a TDD band is indicated.

In operation 1*fb*-15, a gNB 1*fb*-10 may broadcast an MIB and SIB1 associated with a corresponding cell. If the corresponding cell corresponds to a TDD band, and is a cell that supports uplink 7.5 kHz frequency shifting and applies DSS, the gNB may set the cellBarred field of the MIB to "barred", may set an indicator, indicating supporting of uplink 7.5 kHz frequency shifting, in the SIB1 to "true", and may perform broadcasting. Through the above, a legacy UE may receive MIB information and may be barred from accessing the corresponding cell. A UE that is capable of performing uplink 7.5 kHz frequency shifting in a predetermined TDD band may be allowed to access the corresponding cell.

If a UE 1*fb*-05 that is capable of performing uplink 7.5 kHz frequency shifting in the predetermined TDD receives the MIB associated with the corresponding cell, and the cellBarred field of the MIB is set to "barred", the UE 1*fb*-05 may additionally receive SIB1, and may identity band information (whether the band is a TDD band) and information associated with whether to apply uplink 7.5 kHz frequency shifting, in operation 1*fb*-20. If it is identified that the corresponding cell is a TDD band and is a cell that supports uplink 7.5 kHz frequency shifting and applies a DSS, based on the information obtained via the SIB1, the UE camps on the corresponding cell in operation 1*fb*-25. However, based on the SIB1 information, if it is identified that the corresponding cell is not a TDD band, or if it is identified that the indicator indicating supporting of uplink 7.5 kHz frequency shifting is not set to "true" although the corresponding cell is a TDD band, the UE may not camp on the corresponding cell.

The UE may receive additional SIB information broadcasted from the cell that the UE camps on in operation 1*fb*-30, may transfer an RRC setup request message in operation 1*fb*-35, and may perform an additional RRC connection procedure in operation 1*fb*-40. After the RRC connection is setup, the UE may perform data transmission or reception with the corresponding cell. In this instance, the UE performs uplink transmission by applying 7.5 kHz frequency shifting.

FIG. 1GA is a diagram illustrating operation of a UE depending on an uplink 7.5 kHz frequency shifting capability, in an NR standalone (SA) mode according to an embodiment of the disclosure.

Referring to FIG. 1GA, in the embodiment, a UE that is capable of accessing NR may receive system information block 1 (SIB1) associated with a predetermined cell selected in the initial cell selection, and may identify whether the corresponding cell is a HPLMN. Via the system information, SIB1, a PLMN list is provided. The PLMN list is included in CellAccessRelatedInfo. Also, via the SIB1, a serving cell configuration (servingCellConfigCommonSIB) is provided, and thus, uplink/downlink default configuration information may be provided. In the uplink configuration information, an indicator (frequencyShift7p5khz) that indicates whether to perform 7.5 kHz frequency shifting for transmission in an uplink included in a corresponding band may be configured in FrequencyInfoUL-SIB, together with uplink frequency information and the like. If frequencyShift7p5khz is set to "true", when the UE performs uplink transmission in the corresponding cell, the UE may shift a frequency band by 7.5 kHz based on an indicated frequency, and may perform resource transmission. This means that the corresponding cell performs co-existence operation with LTE. Even though the UE is an NR UE, the UE may adjust an uplink operating frequency band to be appropriate for LTE in order to remove interference caused by a UE operating as an LTE cell in the corresponding cell. If the corresponding uplink is an SUL or a defined FDD band, since the UE is designed to be physically capable of performing 7.5 kHz shifting in the corresponding band, the UE may perform subsequent operations without any problem. However, if the corresponding band is a TDD band, a UE which is not capable of implementing 7.5 kHz shifting may not support the same and thus, interference necessarily occurs.

The UE determines whether the corresponding cell operates according to TDD, based on the received SIB1 information in operation 1ga-10. According to an embodiment, the UE may identify whether the corresponding cell operates according to TDD, based on the frequency band of the corresponding cell. Particularly, the UE may identify the same using the center frequency of an SS/PBCH block that the UE uses for the initial access procedure. Alternatively, the UE may use a frequency band that the UE uses to search for the corresponding cell. The UE may identify the same by comparing the identified frequency band with a TDD frequency band list stored in advance in the UE or a SIM card. According to another embodiment, the UE may identify whether frequency information provided in SIB1 is a TDD frequency band. According to another embodiment, the UE may identify whether the corresponding cell is a TDD band using information included in system information (e.g., SIB1 or MIB) transmitted from a base station. The UE may determine the same based on the information associated with whether an indicator (frequencyShift7p5khz) indicating whether to perform uplink 7.5 kHz frequency shifting for transmission is configured in the system information (e.g., SIB1 or MIB) transmitted from the base station. According to another embodiment, the UE may determine whether the corresponding cell corresponds to a TDD band or whether to apply uplink 7.5 kHz frequency shifting for transmission, based on a synchronization signal that the UE receives. In operation 1ga-15, the UE may determine whether the UE is capable of performing uplink 7.5 kHz frequency shifting for the corresponding band, and may determine a subsequent operation based on the determination. According to another embodiment, in operation 1ga-15, the UE may determine whether the UE is capable of performing uplink 7.5 kHz frequency shifting, and may determine a subsequent operation based on the determination. The UE may determine the subsequent operation by taking into consideration a UE capability under the following conditions.

1. Conditions for allowing cell access procedure (Yes in the drawing)
    when a corresponding cell operates according to FDD or SUL: cell access is always allowed
    when a corresponding cell operates according to TDD, and an indicator (frequencyShift7p5khz) indicating whether to perform uplink 7.5 kHz frequency shifting for transmission is not set to "true": cell access is always allowed
    when a corresponding cell operates according to TDD, and an indicator (frequencyShift7p5khz) indicating whether to perform uplink 7.5 kHz frequency shifting for transmission is set to "true": cell access is allowed only when the UE is capable of performing uplink 7.5 kHz frequency shifting 2. Condition for blocking cell access procedure (No in the drawing)
    when a corresponding cell operates according to TDD, and an indicator (frequencyShift7p5khz) indicating whether to perform uplink 7.5 kHz frequency shifting for transmission is set to "true": cell access is blocked when the UE is incapable of performing uplink 7.5 kHz frequency shifting The indicator (frequencyShift7p5khz) indicating whether to perform uplink 7.5 kHz frequency shifting for transmission may be obtained by extending a defined indicator (frequencyShift7p5khz) of the related art. In this instance, a condition of the related art for configuring frequencyShift7p5khz may specify that frequencyShift7p5khz can also be configured for a TDD band. For example, one or more predetermined bands (e.g., n41: TDD band) may be added. The UE may need to perform a procedure of identifying whether the corresponding cell corresponds to a TDD band. According to another embodiment, the UE may need to perform a procedure of identifying whether the corresponding cell corresponds to the one or more predetermined bands. The base station may need to transmit system information (e.g., SIB1 or MIB) including information indicating whether to perform uplink 7.5 kHz frequency shifting for transmission in a TDD band or the one or more predetermined bands. According to an embodiment, one of the conditional presences, provided below in association with the indicator (frequencyShift7p5khz) indicating whether to perform uplink 7.5 kHz frequency shifting for transmission, may be used.

| Conditional Presence | Explanation |
| --- | --- |
| Ex1) LTE-Coexist | The field is optionally present, Need R, if this FrequencyInfoUL is for the paired UL for a DL (defined in a FrequencyInfoDL), if this FrequencyInfoUL is for a supplementary uplink (SUL) or if this FrequencyInfoUL is for n41. It is absent otherwise. |
| Ex2) LTE-Coexist | The field is optionally present, Need R, if this FrequencyInfoUL is for the paired UL for a DL (defined in a FrequencyInfoDL), if this FrequencyInfoUL is for a supplementary uplink (SUL) or if this FrequencyInfoUL is for an unpaired UL. It is absent otherwise. |
| Ex3) FDD-OrSUL | The field is mandatory present if this FrequencyInfoUL is for the paired UL for a DL (defined in a FrequencyInfoDL) or if this FrequencyInfoUL is for a supplementary uplink (SUL). It is absent otherwise (if this FrequencyInfoUL is for an unpaired UL (TDD). |

According to another embodiment, frequencyShift7p5khz may be used as an indicator for FDD and SUL. An additional indicator for a TDD band (e.g., frequencyShift7p5khz-TDD) may be newly introduced. In this instance, a condition for setting frequencyShift7p5khz-TDD to "true" may be added as follows. According to an embodiment, one of the conditional presences, provided below in association with the indicator (frequencyShift7p5khz) indicating whether to perform uplink 7.5 kHz frequency shifting for transmission, may be used.

| Conditional Presence | Explanation |
| --- | --- |
| Ex1) LTE-Coexist | The field is optionally present, Need R, if this FrequencyInfoUL is for n41. It is absent otherwise. |
| Ex2) LTE-Coexist | The field is optionally present, Need R, if this FrequencyInfoUL is for an unpaired UL. It is absent otherwise. |
| Ex3) FDD-OrSUL | The field is mandatory present if this FrequencyInfoUL is for the paired UL for a DL (defined in a FrequencyInfoDL) or if this FrequencyInfoUL is for a supplementary uplink (SUL). It is absent otherwise (if this FrequencyInfoUL is for an unpaired UL (TDD). |

To express the conditions, a method of determining whether frequencyShift7p5khz is configured, and determining whether to perform a cell access procedure based on a condition associated with whether the UE supports uplink 7.5 kHz frequency shifting, may be described in the standard document as operations performed when a UE receives SIB1. An embodiment associated therewith is described as below. In other words, an operation that performs cell access procedure only when the condition is satisfied, otherwise, blocks access to the corresponding cell, may be defined.

Example 1

2> if frequencyShift7p5khz is, either in uplinkConfigCommon or in supplementaryUplink, not included or if the UE supports NR UL transmission with a 7.5 kHz shift to the LTE raster.
3> performing a cell access procedure
2> else:
3> consider the cell as barred in accordance with TS 38.304 [20]; and
3> perform barring as if intraFreqReselection is set to notAllowed;

Example 2

2> if frequencyShift7p5khz is, either in uplinkConfigCommon or in supplementaryUplink, not included or if the UE supports NR UL transmission with a 7.5 kHz shift to the NR Synchronization raster.
3> performing a cell access procedure
2> else:
3> consider the cell as barred in accordance with TS 38.304 [20]; and
3> perform barring as if intraFreqReselection is set to notAllowed;

Example 3

2> if frequencyShift7p5khz is, either in uplinkConfigCommon or in supplementaryUplink, not included or if the UE supports NR UL transmission with a 7.5 kHz shift to the GSNC (Global Synchronization Raster Channel).
3> performing a cell access procedure
2> else:
3> consider the cell as barred in accordance with TS 38.304 [20]; and
3> perform barring as if intraFreqReselection is set to notAllowed;

Example 4

2> if frequencyShift7p5khz is, either in uplinkConfigCommon or in supplementaryUplink, not included or if the UE supports NR UL transmission with a 7.5 kHz shift to the reference point A.
3> performing a cell access procedure
2> else:
3> consider the cell as barred in accordance with TS 38.304 [20]; and
3> perform barring as if intraFreqReselection is set to notAllowed;

Example 4

2> if frequencyShift7p5khz is, either in uplinkConfigCommon or in supplementaryUplink, not included or if the UE supports NR UL transmission with a 7.5 kHz shift to the NR ARFCN on which cell defined SS/PBCH located.
3> performing a cell access procedure
2> else:
3> consider the cell as barred in accordance with TS 38.304 [20]; and
3> perform barring as if intraFreqReselection is set to notAllowed;

If the condition for allowing the cell access procedure is satisfied in operation 1ga-15, the UE accesses the corresponding cell and performs a connection procedure in operation 1ga-20. Particularly, the embodiment focuses on an operation of accessing a TDD band. In operation 1ga-25, the UE applies 7.5 kHz frequency shifting to uplink transmission in the corresponding cell, and may perform transmission. The uplink transmission may include at least one of a random access request, an RRC control message, and a data transmission. In operation 1ga-30, the UE transfers a UE capability in response to a request from the corresponding base station. The UE transmits the UE capability, including a capability associated with uplink 7.5 kHz frequency shifting in a TDD band. According to an embodiment, the UE transmits the UE capability, without a capability associated with uplink 7.5 kHz frequency shifting in a TDD band. The UE capability may be indicated for each band, or for each UE. Here, indicating the UE capability for each band may mean that the UE configures an uplink 7.5 kHz frequency shifting capability to be different for each band when a supportable band is indicated. For example, although multiple TDD bands are supported, if a band that has an uplink 7.5 kHz frequency shifting capability is only n41, the UE may set the uplink 7.5 kHz frequency shifting capability to "true" for n41, and may report the same. Also, indicating the UE capability for each UE may mean that the UE is capable of performing uplink 7.5 kHz frequency shifting for all TDD bands that the UE support. Alternatively, although the UE capability is indicated for each UE, this may indicate that the UE is capable of performing uplink 7.5 kHz frequency shifting for a predetermined band. In this instance, another indicator may be separately needed when an uplink 7.5 kHz frequency shifting capability for another TDD is needed. The base station may use the uplink 7.5 kHz frequency shifting capability indicated for each band or for each UE, during a cell selection process for handover. For example, for a UE that is incapable of performing 7.5 kHz frequency shifting, handover to a cell, for which 7.5 kHz frequency shifting is not configured, may be indicated. For example, for a UE that is incapable of performing 7.5 kHz frequency shifting, measurement of a frequency band in which only a cell for which 7.5 kHz frequency shifting is configured exists, may not be requested.

In operation 1ga-35, the UE may perform data transmission or reception with the base station according to a predetermined condition.

If the condition for allowing the cell access procedure is not satisfied in operation 1ga-15, the UE may perform at least one operation among blocking access to the corresponding cell or triggering cell reselection in operation 1ga-40. According to an embodiment, the UE that is incapable of performing 7.5 kHz frequency shifting, may not attempt to access a cell for which 7.5 kHz frequency shifting is configured. Access barring may be configured for the corresponding cell, based on a parameter (e.g., frequencyShift7p5khz) related to 7.5 kHz frequency shifting, which is identified from the SIB1 or MIB. According to the configuration, the UE may not attempt to access the corresponding cell during a predetermined period of time. The UE identifies that connection to the corresponding cell is not allowed, and may proceed with cell reselection to select another candidate cell. The cell reselection may include at least one of a neighboring cell search process and a neighboring cell measurement process.

FIG. 1GB is another diagram illustrating operation of a UE depending on an uplink 7.5 kHz frequency shifting capability, in an NR standalone (SA) mode according to an embodiment of the disclosure.

Referring to FIG. 1GB, in the embodiment, a UE that is capable of accessing NR may receive a system information block 1 (SIB1) associated with a predetermined cell selected in the initial cell selection, and may identify whether the corresponding cell is a HPLMN. Via the system information, SIB1, a PLMN list is provided. The PLMN list is included in CellAccessRelatedInfo. Also, via the SIB1, a serving cell configuration (servingCellConfigCommonSIB) is provided, and thus, uplink/downlink default configuration information may be provided. In the uplink configuration information, an indicator (frequencyShift7p5khz) that indicates whether to perform 7.5 kHz frequency shifting for transmission in an uplink included in a corresponding band may be configured in FrequencyInfoUL-SIB, together with uplink frequency information and the like. If frequencyShift7p5khz is set to "true", when the UE performs uplink transmission in the corresponding cell, the UE may shift a frequency band by 7.5 kHz based on an indicated frequency, and may perform resource transmission. This means that the corresponding cell performs co-existence operation with LTE. Even though the UE is an NR UE, the UE may adjust an uplink operating frequency band to be appropriate for LTE in order to remove interference caused by a UE operating as an LTE cell in the corresponding cell. If the corresponding uplink is an SUL or a defined FDD band, since the UE is designed to be physically capable of performing 7.5 kHz shifting in the corresponding band, the UE may perform subsequent operations without any problem. However, if the corresponding band is a TDD band, a UE which is not capable of implementing 7.5 kHz shifting may not support the same and thus, interference necessarily occurs.

The UE determines whether the corresponding cell operates according to TDD, based on the received SIB1 information in operation 1gb-10. According to an embodiment, the UE may identify whether the corresponding cell operates according to TDD, based on the frequency band of the corresponding cell. Particularly, the UE may identify the same using the center frequency of an SS/PBCH block that the UE uses for the initial access procedure. Alternatively, the UE may use a frequency band that the UE uses to search for the corresponding cell. The UE may identify the same by comparing the identified frequency band with a TDD frequency band list stored in advance in the UE or a SIM card. According to another embodiment, the UE may identify whether frequency information obtained via the SIB1 is a TDD frequency band. According to another embodiment, the UE may identify whether the corresponding cell corresponds to a TDD band using information included in system information (e.g., SIB1 or MIB) transmitted from a base station. The UE may determine the same based on the information associated with whether an indicator (frequencyShift7p5khz) indicating whether to perform uplink 7.5 kHz frequency shifting for transmission is configured in the system information (e.g., SIB1 or MIB) transmitted from the base station. According to another embodiment, the UE may determine whether the corresponding cell corresponds to a TDD band or whether to apply uplink 7.5 kHz frequency shifting for transmission, based on a synchronization signal that the UE receives. The UE may determine whether the UE is capable of performing uplink 7.5 kHz frequency shifting for the corresponding band in operation 1gb-15, and may determine a subsequent operation based on the determination. According to another embodiment, the UE may determine whether the UE is capable of performing uplink 7.5 kHz frequency shifting, and may determine a subsequent operation based on the determination. The UE may determine the subsequent operation by taking into consideration a UE capability under the following conditions.

3. Conditions for allowing cell access procedure (Yes in the drawing)
  when a corresponding cell operates according to FDD or SUL: cell access is always allowed
  when a corresponding cell operates according to TDD, and an indicator (frequencyShift7p5khz) indicating whether to perform uplink 7.5 kHz frequency shifting for transmission is not set to "true": cell access is always allowed
  when a corresponding cell operates according to TDD, and an indicator (frequencyShift7p5khz) indicating whether to perform uplink 7.5 kHz frequency shifting for transmission is set to "true": cell access is allowed only when the UE is capable of performing uplink 7.5 kHz frequency shifting 4. Condition for blocking cell access procedure (No in the drawing)
  when a corresponding cell operates according to TDD, and an indicator (frequencyShift7p5khz) indicating whether to perform uplink 7.5 kHz frequency shifting for transmission is set to "true": cell access is blocked when the UE is incapable of performing uplink 7.5 kHz frequency shifting The indicator (frequencyShift7p5khz) indicating whether to perform uplink 7.5 kHz frequency shifting for transmission may be obtained by extending a defined indicator (frequencyShift7p5khz) of the related art. In this instance, a condition of the related art for configuring frequencyShift7p5khz may specify that frequencyShift7p5khz can also be configured for a TDD band. For example, one or more predetermined bands (e.g., n41:TDD band) may be added. The UE may need to perform a procedure of identifying whether the corresponding cell corresponds to a TDD band. According to another embodiment, the UE may need to perform a procedure of identifying whether the corresponding cell corresponds to the one or more predetermined bands. The base station may need to transmit system information (e.g., SIB1 or MIB), including information indicating whether to perform uplink 7.5 kHz frequency shift transmission in a TDD band or the one or more predetermined bands. According to an embodiment, one of the conditional presences, provided below in association with the indicator (frequencyShift7p5khz) indicating whether to perform uplink 7.5 kHz frequency shifting for transmission, may be used.

| Conditional Presence | Explanation |
|---|---|
| Ex1) LTE-Coexist | The field is optionally present, Need R, if this FrequencyInfoUL is for the paired UL for a DL (defined in a FrequencyInfoDL), if this FrequencyInfoUL is for a supplementary uplink (SUL) or if this FrequencyInfoUL is for n41. It is absent otherwise. |
| Ex2) LTE-Coexist | The field is optionally present, Need R, if this FrequencyInfoUL is for the paired UL for a DL (defined in a FrequencyInfoDL), if this FrequencyInfoUL is for a supplementary uplink (SUL) or if this FrequencyInfoUL is for an unpaired UL. It is absent otherwise. |
| Ex3) FDD-OrSUL | The field is mandatory present if this FrequencyInfoUL is for the paired UL for a DL (defined in a FrequencyInfoDL) or if this FrequencyInfoUL is for a supplementary uplink (SUL). It is absent otherwise (If this FrequencyInfoUL is for an unpaired UL (TDD). |

According to another embodiment, frequencyShift7p5khz may be used as an indicator for FDD and SUL. An additional indicator for a TDD band (e.g., frequencyShift7p5khz-TDD) may be newly introduced. In this instance, a condition for setting frequencyShift7p5khz-TDD to "true" may be added as follows. According to an embodiment, one of the conditional presences, provided below in association with the indicator (frequencyShift7p5khz) indicating whether to perform uplink 7.5 kHz frequency shifting for transmission, may be used.

| Conditional Presence | Explanation |
|---|---|
| Ex1) LTE-Coexist | The field is optionally present, Need R, if this FrequencyInfoUL is for n41. It is absent otherwise. |
| Ex2) LTE-Coexist | The field is optionally present, Need R, if this FrequencyInfoUL is for an unpaired UL. It is absent otherwise. |
| Ex3) FDD-OrSUL | The field is mandatory present if this FrequencyInfoUL is for the paired UL for a DL (defined in a FrequencyInfoDL) or if this FrequencyInfoUL is for a supplementary uplink (SUL). It is absent otherwise (if this FrequencyInfoUL is for an unpaired UL (TDD). |

To express the conditions, a method of determining whether frequencyShift7p5khz is configured, and determining whether to perform a cell access procedure based on a condition associated with whether the UE supports uplink 7.5 kHz frequency shifting, may be described in the standard document, as operations performed when a UE receives the SIB1. An embodiment associated therewith is described as below. In other words, an operation that performs a cell access procedure only when the condition is satisfied, otherwise, blocks access to the corresponding cell, may be defined.

Example 1

2> if frequencyShift7p5khz is, either in uplinkConfigCommon or in supplementaryUplink, not included or if the UE supports NR UL transmission with a 7.5 kHz shift to the LTE raster.
 3> performing a cell access procedure
2> else:
 3> consider the cell as barred in accordance with TS 38.304 [20]; and
 3> perform barring as if intraFreqReselection is set to notAllowed;

Example 2

2> if frequencyShift7p5khz is, either in uplinkConfigCommon or in supplementaryUplink, not included or if the UE supports NR UL transmission with a 7.5 kHz shift to the NR Synchronization raster.
 3> performing a cell access procedure
2> else:
 3> consider the cell as barred in accordance with TS 38.304 [20]; and
 3> perform barring as if intraFreqReselection is set to notAllowed;

Example 3

2> if frequencyShift7p5khz is, either in uplinkConfigCommon or in supplementaryUplink, not included or if the UE supports NR UL transmission with a 7.5 kHz shift to the Global Synchronization Raster Channel (GSNC).
 3> performing a cell access procedure
2> else:
 3> consider the cell as barred in accordance with TS 38.304 [20]; and
 3> perform barring as if intraFreqReselection is set to notAllowed;

Example 4

2> if frequencyShift7p5khz is, either in uplinkConfigCommon or in supplementaryUplink, not included or if the UE supports NR UL transmission with a 7.5 kHz shift to the reference point A.
 3> performing a cell access procedure
2> else:
 3> consider the cell as barred in accordance with TS 38.304 [20]; and
 3> perform barring as if intraFreqReselection is set to notAllowed;

Example 4

2> if frequencyShift7p5khz is, either in uplinkConfigCommon or in supplementaryUplink, not included or if the UE supports NR UL transmission with a 7.5 kHz shift to the NR ARFCN on which cell defined SS/PBCH located.
 3> performing a cell access procedure
2> else:
 3> consider the cell as barred in accordance with TS 38.304 [20]; and
 3> perform barring as if intraFreqReselection is set to notAllowed;

If the condition for allowing the cell access procedure is satisfied in operation 1gb-15, the UE accesses the corresponding cell and performs a connection procedure in operation 1gb-20. Particularly, the embodiment focuses on an operation of accessing a TDD band. In operation 1gb-25, the UE applies 7.5 kHz frequency shifting to uplink transmission in the corresponding cell, and may perform transmission. The uplink transmission may include at least one of a random access request, an RRC control message, and a data transmission. In the embodiment, the UE may have different uplink 7.5 kHz frequency capabilities for the TDD band, depending on the version of the UE. That is, a Rel-15 UE does not have the corresponding capability, but a Rel-16 UE or a UE above Rel-16 may mandatorily support the capability. In this instance, if the corresponding TDD cell configures uplink 7.5 kHz frequency shifting for a TDD band, a legacy Rel-15 UE may be barred from accessing the cell, but the Rel-16 UE may access the cell.

In operation 1gb-30, the UE may perform data transmission or reception with the base station according to a predetermined condition. In operation 1gb-30, the UE transfers a UE capability in response to a request from the corresponding base station. The UE transmits the UE capability, including a capability associated with uplink 7.5 kHz frequency shifting in a TDD band. According to an embodiment, the UE transmits the UE capability, without a capability associated with uplink 7.5 kHz frequency shifting in a TDD band. The UE capability may be indicated for each band, or for each UE. Here, indicating the UE capability for each band may mean that the UE configures an uplink 7.5 kHz frequency shifting capability to be different for each band when a supportable band is indicated. For example, although multiple TDD bands are supported, if a band that has an uplink 7.5 kHz frequency shifting capability is only n41, the UE may set the uplink 7.5 kHz frequency shifting capability to "true" for n41, and may report the same. Also, indicating the UE capability for each UE may mean that the UE is capable of performing uplink 7.5 kHz frequency shifting for all TDD bands that the UE supports. Alternatively, although the UE capability is indicated for each UE, this may indicate that the UE is capable of performing uplink 7.5 kHz frequency shifting for a predetermined band. In this instance, another indicator may be separately needed when an uplink 7.5 kHz frequency shifting capability for another TDD is needed. The base station may use the uplink 7.5 kHz frequency shifting capability indicated for each band or for each UE, during a cell selection process for handover. For example, for a UE that is incapable of performing 7.5 kHz frequency shifting, handover to a cell, for which 7.5 kHz frequency shifting is not configured, may be indicated. For example, for a UE that is incapable of performing 7.5 kHz frequency shifting, measurement of a frequency band in which only a cell, for which 7.5 kHz frequency shifting is configured, exists, may not be requested.

If the condition for allowing the cell access procedure is not satisfied in operation 1gb-15, the UE may perform at least one operation among blocking access to the corresponding cell or triggering cell reselection in operation 1gb-40. According to an embodiment, the UE that is incapable of performing 7.5 kHz frequency shifting, may not attempt to access a cell for which 7.5 kHz frequency shifting is configured. Access barring may be configured for the corresponding cell, based on a parameter (e.g., frequencyShift7p5khz) related to 7.5 kHz frequency shifting, which is identified from the SIB1 or MIB. According to the configuration, the UE may not attempt to access the corresponding cell during a predetermined period of time. The UE identifies that connection to the corresponding cell is not allowed, and may proceed with cell reselection to select another candidate cell. The cell reselection may include at least one of a neighboring cell search process and a neighboring cell measurement process.

FIG. 1GC is a diagram illustrating operation of a UE according to another solution (additional solution) that supports operation by connecting a TDD cell that supports uplink 7.5 kHz frequency shifting, in an NR standalone (SA) mode according to the first embodiment of the disclosure.

Referring to FIG. 1GC, a procedure for supporting dynamic spectrum sharing (DS S) between LTE and NR in a predetermined TDD band, in addition to a N41 band, may be needed. The procedure may be performed with reference to an existing procedure performed in the FDD, that is, a procedure that identifies whether uplink 7.5 kHz frequency shifting is supported based on the SIB1, and applies the same. However, uplink 7.5 kHz frequency shifting in a TDD band is not currently supported, and thus, if the procedure is applied to a predetermined TDD band, a backward compatibility problem may occur.

Particularly, referring to the drawing, DSS is applied to a predetermined TDD band, and legacy UEs need to be prevented from camping on or accessing the predetermined TDD band to which DSS is applied. In the existing NR system, if a cellBarred field of an MIB is set to "barred", camp-on and access to the corresponding cell is not performed. According to the method provided in the drawing, although the cellBarred field of the MIB is set to "barred", a UE that is capable of performing DSS in a predetermined TDD may identify band information (whether the corresponding band is a TDD band) and information whether to apply uplink 7.5 kHz frequency shifting, which are obtained based on the SIB1, and may determine that the corresponding cell is not barred if the uplink 7.5 kHz frequency shifting in a TDD band is indicated.

Particularly, the above-mentioned operation may be applied only to a predetermined TDD band.

In operation 1gc-05, a UE may receive an MIB from a base station. In the operation, the UE may be in an RRC IDLE state, and may perform cell selection and cell reselection for searching for a cell to camp on. That is, if the UE receives an MIB associated with the corresponding cell, and the cellBarred field of the received MIB is set to "barred", the UE operates differently depending on the version of the UE. That is, in operation 1gc-10, the UE may operate differently depending on release information of the UE and whether 7.5 kHz frequency shifting in a predetermined TDD band is supported (alternatively, a Rel-16 UE may mandatorily implement a capability of 7.5 kHz frequency shifting in a predetermined TDD band, and in this instance, only release information of the UE may be taken into consideration). In the case in which the UE is a Release 15 UE, or the UE is a UE above Release 16 but does not have the corresponding capability, if the cellBarred field in the MIB is set to "barred", the UE may determine that the corresponding cell is barred and may block access to the corresponding cell and trigger cell reselection, in operation 1gc-15. However, if the UE is a UE above Release 16 or is capable of performing 7.5 kHz frequency shifting in a predetermined TDD band, the UE additionally receives SIB1, so as to determine band information (whether the corresponding band is a TDD band) and whether to apply uplink 7.5 kHz frequency shifting, in operation 1gc-20. As described above, if the cellBarred field of the MIB is set to "barred", a legacy UE that does not support DSS in a predetermined TDD band may determine that the corresponding cell is barred, and may reselect another cell.

Whether the corresponding cell corresponds to a band to which DSS is applicable may be determined based on information obtained via the received SIB1 in operation 1gc-35. If the corresponding cell does not correspond to a predetermined TDD band that supports DSS (if band information is an FDD band or a TDD band different from the predetermined TDD band), the UE determines that the corresponding cell is barred, does not camp on the corresponding cell in operation 1gc-40. That is, the UE blocks a connection procedure, triggers a cell reselection procedure, and performs a procedure for connecting to another cell. Alternatively, although the corresponding band is an FDD band, the procedure is not applied but the following operation may be performed.

If it is identified that the corresponding cell is a TDD band, based on the SIB1 information received in operation 1gc-20, whether the corresponding cell indicates uplink 7.5 kHz frequency shifting is identified in operation 1gc-35. If an indicator indicating uplink 7.5 kHz frequency shifting in the corresponding TDD cell is not set to "true", the UE determines that the corresponding cell is barred, and does not camp on the corresponding cell. That is, the UE blocks a connection procedure, triggers a cell reselection procedure, and performs a procedure for connecting to another cell. This operation is performed by reason that the MIB of the corresponding cell indicates "barring".

Conversely, if an indicator indicating uplink 7.5 kHz frequency shifting in the corresponding TDD cell is set to "true", the UE determines the corresponding TDD cell as a cell to which DSS is applied, and camps on the corresponding cell in operation 1gc-45. That is, access to the corresponding cell is allowed so that a cell connection procedure associated with the corresponding cell is performed. In other words, the UE receives additional SIB information broadcasted from the cell that the UE camps on, transfers an RRC setup request message, and performs an additional RRC connection procedure.

After the RRC connection is setup, the UE performs data transmission or reception with the corresponding cell in operation 1gc-50. In this instance, the UE performs uplink transmission by applying 7.5 kHz frequency shifting in operation 1gc-55.

In the all procedures, information associated with a TDD band to which DSS is applicable may be pre-configured for the UE, or may be stored in a non-volatile memory.

FIG. 1H is a diagram illustrating operation of a UE depending on an uplink 7.5 kHz frequency shifting capability, in multi-RAT DC (MR-DC) (e.g., NGEN-DC, EN-DC, NG-DC) according to a second embodiment of the disclosure.

Referring to FIG. 1H, according to the embodiment, a method of applying an EN-DC configuration is different depending on the uplink 7.5 kHz frequency shifting capability of a UE that connects to an LTE cell for which EN-DC is configurable.

According to the embodiment, a method of applying an MR-DC configuration is different depending on the uplink 7.5 kHz frequency shifting capability of a UE that connects to an NR cell for which MR-DC is configurable.

Although the following description and the drawing related thereto are provided from the perspective of EN-DC, the disclosure is not limited to EN-DC, and MR-DC is also applicable. In this instance, the case in which an MN operates according to NR and an SN operates according to LTE may be included.

In operation 1h-05, the UE may perform an initial cell access procedure with respect to an LTE cell, and may set up an RRC connection to the corresponding cell. In operation 1h-10, the UE may be requested to report a UE capability, after connecting to the LTE cell. In operation 1h-15, the UE capability report request may include a request for NR and MR-DC UE capability, and the UE may report the UE capability according to a predetermined procedure, upon reception of the request.

In operation 1h-20, the NR and MR-DC UE capability, including an uplink 7.5 kHz frequency shifting capability associated with an NR TDD band, may be transmitted. The UE capability may be indicated for each band, or for each UE. Here, indicating the UE capability for each band may mean that the UE configures an uplink 7.5 kHz frequency shifting capability to be different for each band when a supportable band is indicated. For example, although multiple TDD bands are supported, if a band that has an uplink 7.5 kHz frequency shifting capability is only n41, the UE may configure the uplink 7.5 kHz frequency shifting capability to "true" for n41, and may report the same. Indicating the UE capability for each UE may mean that the UE is capable of performing uplink 7.5 kHz frequency shifting for all TDD bands that the UE support. Alternatively, although the UE capability is indicated for each UE, this may indicate that the UE is capable of performing uplink 7.5 kHz frequency shifting for a predetermined band. In this instance, another indicator may be separately needed when an uplink 7.5 kHz frequency shifting capability for another TDD is needed. The base station may use the uplink 7.5 kHz frequency shifting capability indicated for each band or for each UE, during a cell selection process for handover. For example, for a UE that is incapable of performing 7.5 kHz frequency shifting, handover to a cell, for which 7.5 kHz frequency shifting is not configured, may be indicated. For example, for a UE that is incapable of performing 7.5 kHz frequency shifting, measurement of a frequency band in which only a cell, for which 7.5 kHz frequency shifting is configured, exists, may not be requested. As described with reference to FIG. 1GB, the operation of reporting the UE capability may be omitted if the corresponding capability is mandatorily supported to UEs above Rel-16.

Subsequently, in operation 1h-25, the UE may receive EN-DC configuration information from a base station, and the corresponding message may include a configuration that configures an NR cell operating in an NR TDD band as a secondary cell group (SCG). In operation 1h-30, the UE always applies 7.5 kHz frequency shifting for uplink transmission in the configured NR SCG. The all uplink transmission may include a random access request, an RRC control message, a data transmission, and the like. That is, in operation 1h-35, the UE and the base station may perform data transmission or reception according to the EN-DC configuration.

If the UE does not have the corresponding capability for the predetermined band, the UE may not report the capability in operation 1h-20. In this instance, since it is an expression that the UE is incapable of accessing the corresponding TDD cell, and an EN-DC configuration associated with a cell for which 7.5 kHz frequency shifting is configured is not delivered. That is, subsequently, in operation 1h-25, the UE may perform data transmission or reception with a serving LTE cell, or an EN-DC configuration associated with another NR cell, different from a TDD cell (e.g., an NR cell of an FDD band), is configured and subsequent operations may be performed.

FIG. 1I is a diagram illustrating operation of a base station (gNB) depending on an uplink 7.5 kHz frequency shifting capability, in an NR standalone (SA) mode according to the first embodiment of the disclosure.

Referring to FIG. 1I, it illustrates operation of a gNB in a TDD band that operates in the NR standalone mode. Particularly, the operation is characterized by cell access by a UE capable of performing uplink 7.5 kHz frequency shifting in the corresponding band, and a UE capability report. In operation 1i-05, the gNB broadcasts SIB1 or MIB, including cell information of the gNB. The cell information may include a PLMN list, which is included in CellAccessRelatedInfo. Also, the SIB1 or MIB may include a serving cell configuration (servingCellConfigCommonSIB), and thus, uplink/downlink default configuration information may be provided. In the uplink configuration information, an indicator (frequencyShift7p5khz) that indicates whether to perform 7.5 kHz frequency shifting for transmission in an uplink included in a corresponding band may be configured in FrequencyInfoUL-SIB, together with uplink frequency information and the like. That is, by broadcasting the SIB1 or MIB, information indicating that the corresponding cell is a TDD band and whether coexistence of LTE and NR is supportable may be indicated. Cells that perform a connection procedure with respect to the corresponding cell may correspond to UEs capable of performing uplink 7.5 kHz frequency shifting in a TDD band. Since the gNB identifies the same, the gNB performs an RRC connection procedure with a UE in operation 1i-10, and interprets (detects/decodes) uplink transmission delivered from the UE by performing 7.5 kHz frequency shifting, after performing the RRC connection procedure with the UE, in operation 1i-15. Subsequently, the gNB requests a UE capability from the UE, so as to determine whether the UE is capable of performing 7.5 kHz frequency shifting in the corresponding band, and may use the corresponding information for DC and CA, or for handover, which may be performed later on.

FIG. 1IC is a diagram illustrating operation of a base station (gNB) according to another solution (additional solution) that supports operation by connecting to a TDD cell that supports uplink 7.5 kHz frequency shifting, in an NR standalone (SA) mode according to the first embodiment of the disclosure.

Referring to FIG. 1IC, it illustrates operation of a gNB in a TDD band that operates in the NR standalone mode. Particularly, the operation is characterized by jointly using MIB information and SIB1 information in order to block or allow cell access by a UE that is capable of performing uplink 7.5 kHz frequency shifting in the corresponding band.

In operation 1ic-05, the gNB broadcasts SIB1 or MIB, including cell information of the gNB. If the corresponding cell corresponds to a TDD band, and is a cell that supports uplink 7.5 kHz frequency shifting and applies DSS, the gNB may set the cellBarred field of the MIB to "barred", may set an indicator indicating uplink 7.5 kHz frequency shifting in the SIB1 to "true", and may perform broadcasting. Through the above, a legacy UE may receive the MIB information and may be barred from accessing the corresponding cell. A UE that is capable of performing uplink 7.5 kHz frequency shifting in a TDD band may be allowed to access the corresponding cell. If the corresponding cell does not support uplink 7.5 kHz frequency shifting, the indicator in SIB1 is not set to "true". In this instance, the cellBarred field of the MIB may be managed independently. That is, the corresponding field is set to "barred" only when cellBarred is actually needed.

For reference, the cell information may include a PLMN list, which is included in CellAccessRelatedInfo. The SIB1 or MIB may include a serving cell configuration (servingCellConfigCommonSIB), and thus, uplink/downlink default configuration information may be provided. In the uplink configuration information, an indicator (frequencyShift7p5khz) that indicates whether to perform 7.5 kHz frequency shifting for transmission in an uplink included in the corresponding band may be configured in FrequencyInfoUL-SIB, together with uplink frequency information and the like. That is, by broadcasting the SIB1 or MIB, information indicating that the corresponding cell is a TDD band and whether coexistence of LTE and NR is supportable may be indicated. Subsequently, cells that perform a connection procedure with respect to the corresponding cell may correspond to UEs, capable of performing uplink 7.5 kHz frequency shifting in the TDD band. Since the gNB identifies the same, the gNB performs an RRC connection procedure with a UE in operation 1ic-10, and interprets (detects/decodes) uplink transmission delivered from the UE by performing 7.5 kHz frequency shifting, after performing the RRC connection procedure with the UE, in operation 1ic-15. Subsequently, the gNB requests a UE capability from the UE, so as to determine whether the UE is capable of performing 7.5 kHz frequency shifting in the corresponding band, and may use the corresponding information for DC and CA, or for handover, which may be performed later on.

FIG. 1J is a diagram illustrating operation of a base station (eNB) depending on an uplink 7.5 kHz frequency shifting capability, in EN-DC (non-standalone (NSA)) according to the second embodiment of the disclosure.

Referring to FIG. 1J, it illustrates a process of configuring EN-DC that configures an NR TDD cell, particularly, a cell that supports LTE/NR coexistence operation, as an SCG, for a UE capable of performing uplink 7.5 kHz frequency shifting in a TDD band among UEs accessing an LTE cell that is operable in the EN-DC mode. An LTE eNB performs a connection procedure with a UE in operation 1j-05, and transfers, to the UE, a UE capability request message that requests NR and MR-DC UE capability in operation 1j-10. The UE retrieves and transfers a UE capability in response to the request from the eNB, and the eNB may analyze and identify the UE capability received from the UE in operation 1h-15. Particularly, the eNB identifies whether a capability of uplink 7.5 kHz frequency shifting in an NR TDD band is included in the reported UE capability. The identification may be referred to for determining EN-DC configuration, handover, and the like.

In operation 1j-20, the eNB may provide the EN-DC configuration to the UE, based on the UE capability. That is, according to the embodiment, in the situation that requires a TDD band and LTE/NR coexistence operation, the eNB may configure, for a UE, EN-DC that configures the corresponding band as an SCG. In operation 1j-25, the eNB and the UE may perform data transmission or reception according to the EN-DC configuration. In operations 1j-20 to 1j-25, the eNB may configure a target cell for handover, based on the UE capability information associated with uplink 7.5 kHz frequency shifting in an NR TDD band, when the UE needs inter-system handover from an LTE cell to an NR cell, in addition to the EN-DC configuration. That is, only when the UE is capable of performing uplink 7.5 kHz frequency shifting in the NR TDD band, handover to a target cell, that is, a cell that supports a TDD band and LTE/NR coexistence operation, may be performed.

FIG. 1K is a block diagram illustrating the internal structure of a UE according to an embodiment of the disclosure.

Referring to FIG. 1K, the UE includes a radio frequency (RF) processor 1k-10, a baseband processor 1k-20, a storage unit 1k-30, and a controller 1k-40.

The RF processor 1k-10 performs a function for transmitting or receiving a signal via a wireless channel, such as band conversion and amplification of a signal. That is, the RF processor 1k-10 up-converts a baseband signal provided from the baseband processor 1k-20 into an RF band signal so as to transmit the RF band signal via an antenna, and down-converts an RF band signal received via the antenna into a baseband signal. For example, the RF processor 1k-10 may include a transmission filter, a reception filter, an amplifier, a mixer, an oscillator, a digital-to-analog converter (DAC), an analog-to-digital converter (ADC), and the like. Although the drawing illustrates only a single antenna, the UE may include a plurality of antennas. In addition, the RF processor 1k-10 may include a plurality of RF chains. Moreover, the RF processor 1k-10 may perform beamforming. For the beamforming, the RF processor 1k-10 may control the phase and the size of each signal transmitted or received via a plurality of antennas or antenna elements. Also, the RF processor may perform MIMO, and may receive multiple layers when performing a MIMO operation. According to an embodiment, 7.5 kHz frequency shifting may be applied to a signal that the RF processor 1k-10 is to transmit.

The baseband processor 1k-20 executes a function of converting between a baseband signal and a bitstream, according to the physical layer standard of a system. For example, in the case of data transmission, the baseband processor 1k-20 encodes and modulates a transmission bitstream, so as to generate complex symbols. In addition, in the case of data reception, the baseband processor 1k-20, restores a reception bitstream by demodulating and decoding a baseband signal provided from the RF processor 1k-10. For example, according to an orthogonal frequency division multiplexing (OFDM) scheme, in the case of data transmission, the baseband processor 1k-20 generates complex symbols by encoding and modulating a transmission bitstream, maps the complex symbols to subcarriers, and then configures OFDM symbols via an inverse fast Fourier transform (IFFT) operation and cyclic prefix (CP) insertion. Furthermore, in the case of data reception, the baseband processor 1k-20 divides a baseband signal provided from the RF processor 1k-10 in units of OFDM symbols, reconstructs signals mapped to the subcarriers via a fast Fourier transform (FFT) operation, and then reconstructs a received bitstream via demodulation and decoding. According to an embodiment, 7.5 kHz frequency shifting may be applied to a signal that the RF processor 1k-10 is to transmit.

The baseband processor 1k-20 and the RF processor 1k-10 transmit and receive signals as described above. Accordingly, the baseband processor 1k-20 and the RF processor 1k-10 may be referred to as a transmitter, a receiver, a transceiver, or a communication unit. Furthermore, at least one of the baseband processor 1k-20 and the RF processor 1k-10 may include a plurality of communication modules in order to support different multiple radio access technologies. In addition, at least one of the baseband processor 1k-20 and the RF processor 1k-10 may include different communication modules to process signals of different frequency bands. For example, the different radio access technologies may include a wireless local area network (LAN) (e.g., IEEE 802.11), a cellular network (e.g., LTE), and the like. In addition, the different frequency bands may include a super high frequency (SHF) (e.g., 2.NRhz, NRhz) band and a millimeter (mm) wave (e.g., 60 GHz) band.

The storage unit 1k-30 stores data such as a basic program, an application program, and configuration information for the operation of the UE. Particularly, the storage unit 1k-30 may store information related to a second access node that performs wireless communication using a second radio access technology. In addition, the storage unit 1k-30 provides data stored therein according to a request of the controller 1k-40.

The controller 1k-40 controls overall operation of the UE. For example, the controller 1k-40 may perform transmission or reception of a signal via the baseband processor 1k-20 and the RF processor 1k-10. In addition, the controller 1k-40 may record data in the storage unit 1k-30 and read the data. To this end, the controller 1k-40 may include at least one processor. For example, the controller 1k-40 may include a communication processor (CP) that performs control for communication, and an application processor (AP) that controls a higher layer such as an application program.

FIG. 1L is a block diagram illustrating the configuration of a base station according to an embodiment of the disclosure.

Referring to FIG. 1L, the base station may include an RF processor 1l-10, a baseband processor 1l-20, a backhaul communication unit 1l-30, a storage unit 1l-40, and a controller 1l-50.

The RF processor 1l-10 performs a function for transmitting or receiving a signal via a wireless channel, such as band conversion and amplification of a signal. That is, the RF processor 1l-10 up-converts a baseband signal provided from the baseband processor 1l-20 into an RF band signal so as to transmit the RF band signal via an antenna, and down-converts an RF band signal received via the antenna into a baseband signal. For example, the RF processor 1l-10 may include a transmission filter, a reception filter, an amplifier, a mixer, an oscillator, a DAC, an ADC, and the like. Although the drawing illustrates only a single antenna, a first access node may include a plurality of antennas. In addition, the RF processor 1l-10 may include a plurality of RF chains. Moreover, the RF processor 1l-10 may perform beamforming. For the beamforming, the RF processor 1l-10 may control the phase and the size of each of the signals transmitted or received via a plurality of antennas or antenna elements. The RF processor may perform a downlink MIMO operation by transmitting one or more layers.

The baseband processor 1l-20 performs a function for conversion between a baseband signal and a bitstream according to the physical layer standard of a first radio access technology. For example, in the case of data transmission, the baseband processor 1k-20 encodes and modulates a transmission bitstream, so as to generate complex symbols. In addition, in the case of data reception, the baseband processor 1l-20, restores a reception bitstream by demodulating and decoding a baseband signal provided from the RF processor 1l-10. For example, according to the OFDM scheme, in the case of data transmission, the baseband processor 1l-20 may generate complex symbols by encoding and modulating a transmission bitstream, map the complex symbols to subcarriers, and then configure OFDM symbols via an IFFT operation and CP insertion. Also, in the case of data reception, the baseband processor 1l-20 divides a baseband signal provided from the RF processor 1l-10 in units of OFDM symbols, restores signals mapped onto the subcarriers via the FFT operation, and restore a received bit stream via demodulation and decoding. The baseband processor 1l-20 and the RF processor 1l-10 transmit and receive signals as described above. Accordingly, the baseband processor 1l-20 and the RF processor 1l-10 may be referred to as a transmitter, a receiver, a transceiver, a communication unit, or a wireless communication unit.

The backhaul communication unit 1l-30 may provide an interface for performing the communication with other nodes in a network. That is, the backhaul communication unit 1l-30 may convert, into a physical signal, a bit stream transmitted from the main base station to another node, for example, a secondary base station, a core network, and the like, and may convert a physical signal received from the other node into a bit stream.

The storage unit 1l-40 stores data such as a basic program, an application program, and configuration information for the operation of the main base station. Particularly, the storage unit 1l-40 may store information associated with a bearer allocated to a connected UE, a measurement result reported from the connected UE, and the like. In addition, the storage unit 1l-40 may store information which is a criterion for determining whether to provide or suspend multiple accesses to a UE. In addition, the storage unit 1l-40 provides data stored therein according to a request of the controller 1l-50.

The controller 1l-50 may control the overall operation of the main base station. For example, the controller 1l-50 may transmit or receive a signal via the baseband processor 1l-20 and the RF processor 1l-10, or via the backhaul communication unit 1l-30. In addition, the controller 1l-50 may record data in the storage unit 1l-40 and read the data. To this end, the controller 1l-50 may include at least one processor.

Figure 1V:
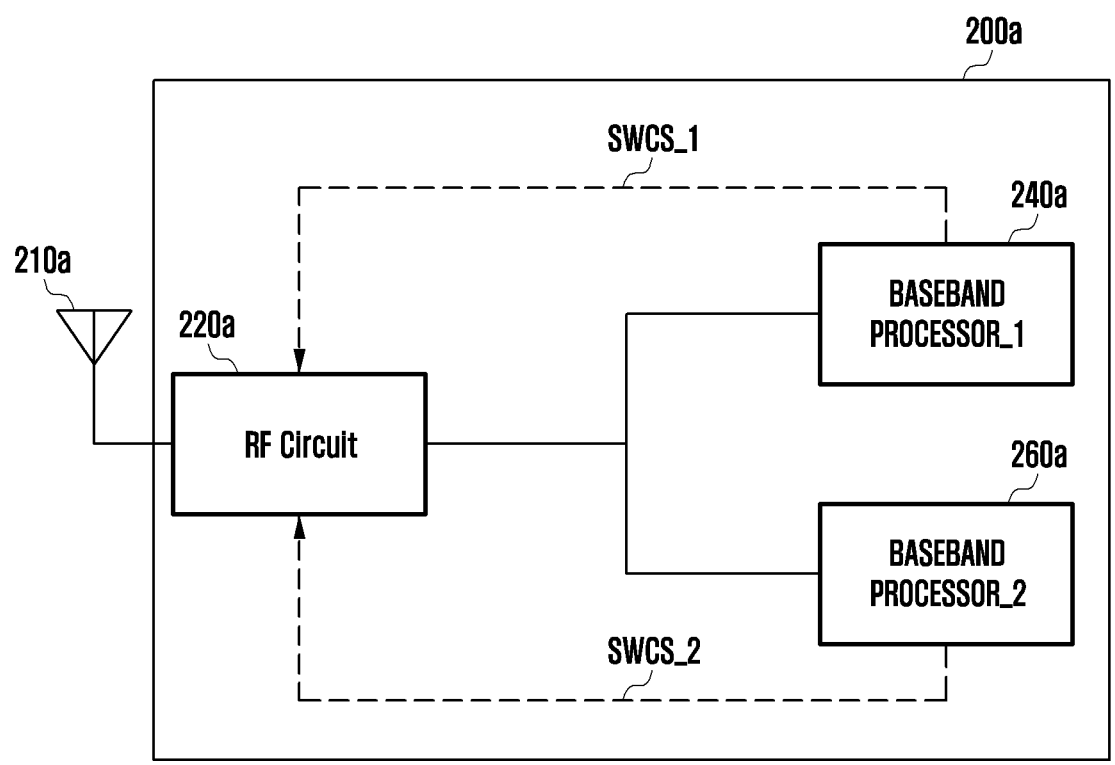
FIG. 1V is a block diagram illustrating the configuration of a wireless communication device according to an embodiment of the disclosure.

FIG. 1V is a block diagram illustrating the configuration of a wireless communication device 200a according to an embodiment of the disclosure.

Figure 1W:
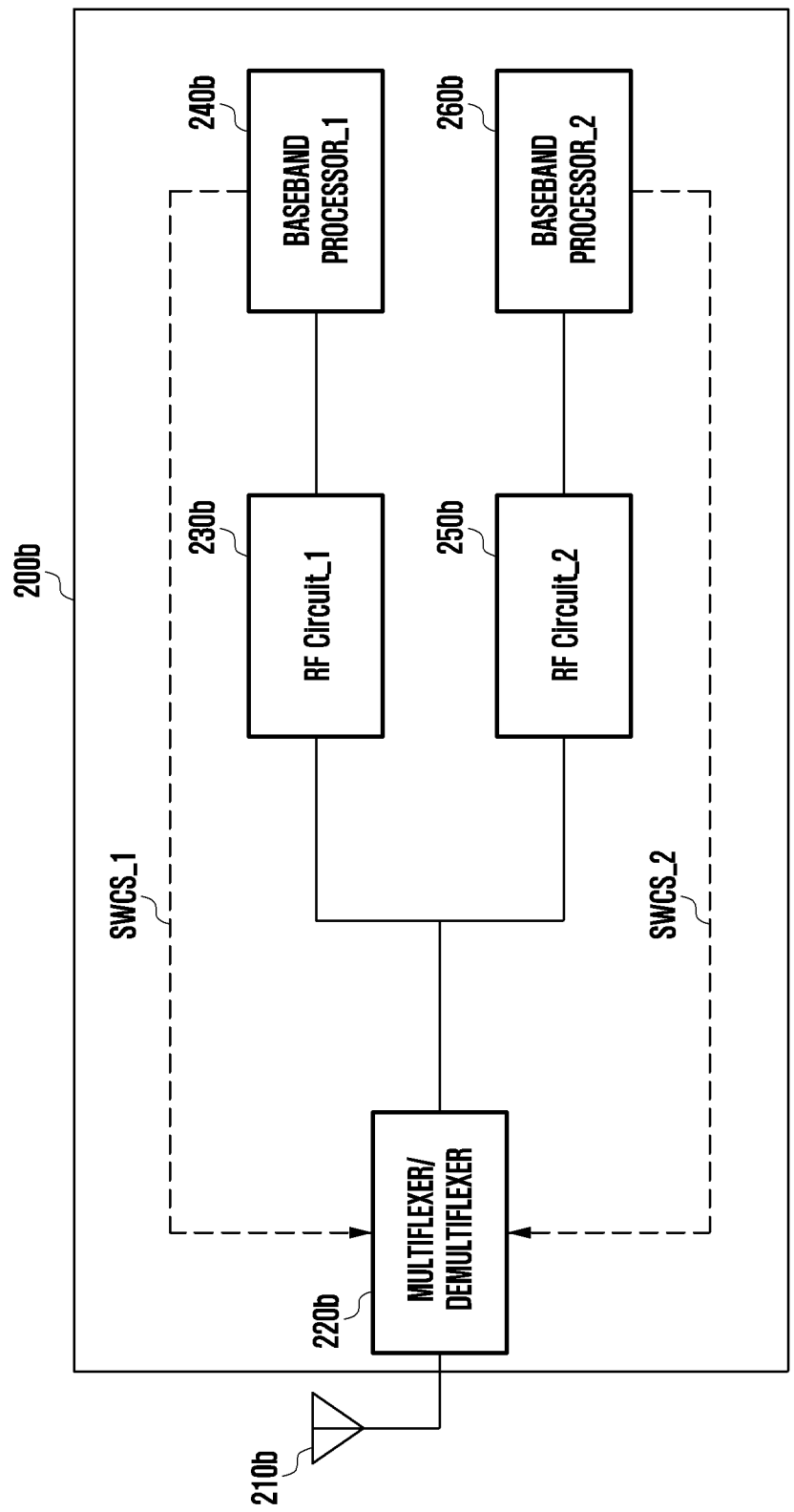
FIG. 1W is a block diagram illustrating the configuration of a wireless communication device according to an embodiment of the disclosure.

FIG. 1W is a block diagram illustrating the configuration of a wireless communication device 200b according to an embodiment of the disclosure.

Referring to FIG. 1V, the wireless communication device 200a may include an antenna 210a, an RF circuit 220a, a first baseband processor 240a, and a second baseband processor 260a. According to an embodiment, the first baseband processor 240a and the second baseband processor 260a may generate a first switching control signal (SWCS_1) and a second switching control signal (SWCS_2) and may provide the same to the RF circuit 220a, respectively. The RF circuit 220a may include a multiplexer (not illustrated), may transmit an uplink signal, including at least one of a first uplink signal and a second uplink signal, via the antenna 210a, may selectively transmit a first uplink signal based on the first switching control signal (SWCS_1) by using a signal from the first baseband processor 240a, and may selectively transmit a second uplink signal based on the second switching control signal (SWCS_2) by using a signal from the first baseband processor 240a. Also, in the case of transmission of the first uplink signal and the second uplink signal, a method of determining whether to apply 7.5 kHz frequency shifting, based on the first switching control signal (SWCS_1) and the second switching control signal (SWCS_2), may be used.

According to an embodiment, the first baseband processor 240a may obtain a configuration associated with the first uplink signal based on an LTE-based higher signal, and the first baseband processor 240a may determine whether to apply 7.5 kHz frequency shifting to the first uplink signal based on the same. The first baseband processor 240a may or may not apply 7.5 kHz frequency shifting based on the determination.

According to an embodiment, the second baseband processor 260a may obtain a configuration associated with the second uplink signal based on an NR-based higher signal, and the second baseband processor 260a may determine whether to apply 7.5 kHz frequency shifting to the second uplink signal based on the same. The second baseband processor 260a may or may not apply 7.5 kHz frequency shifting based on the determination.

According to an embodiment, the first baseband processor 240a may obtain a configuration associated with the first uplink signal, based on an LTE-based higher signal, and the first baseband processor 240a may generate a first switching control signal (SWCS_1) based on the same. The configuration associated with the first uplink signal may include information related to whether to apply 7.5 kHz frequency shifting. The first baseband processor 240a may determine whether to apply 7.5 kHz frequency shifting to the first uplink signal, based on the same. The first switching control signal (SWCS_1) may include an indicator indicating whether to apply 7.5 kHz frequency shifting to an RF unit. According to an embodiment, the second baseband processor 260a may obtain a configuration associated with the second uplink signal, based on an NR-based higher signal, and the second baseband processor 260a may generate a second switching control signal (SWCS_2) based on the same. The configuration associated with the second uplink signal may include information related to whether to apply 7.5 kHz frequency shifting. The second baseband processor 260a may determine whether to apply 7.5 kHz frequency shifting to the second uplink signal, based on the same. The second switching control signal (SWCS_2) may include an indicator indicating whether to apply 7.5 kHz frequency shifting to an RF unit.

As described above, via the configuration of the wireless communication device 200a, the RF circuit 220a may selectively provide, to the antenna 210a, the first uplink signal for LTE wireless communication and the second uplink signal for NR wireless communication, which are provided from the baseband processors, respectively.

Referring to FIG. 1W, the wireless communication device 200b may further include a multiplexer implemented as a separate block, and may perform uplink-based wireless communication using the multiplexer. Detailed description thereof, which has been described with reference to FIG. 1V, will be omitted.

Figure 1X:
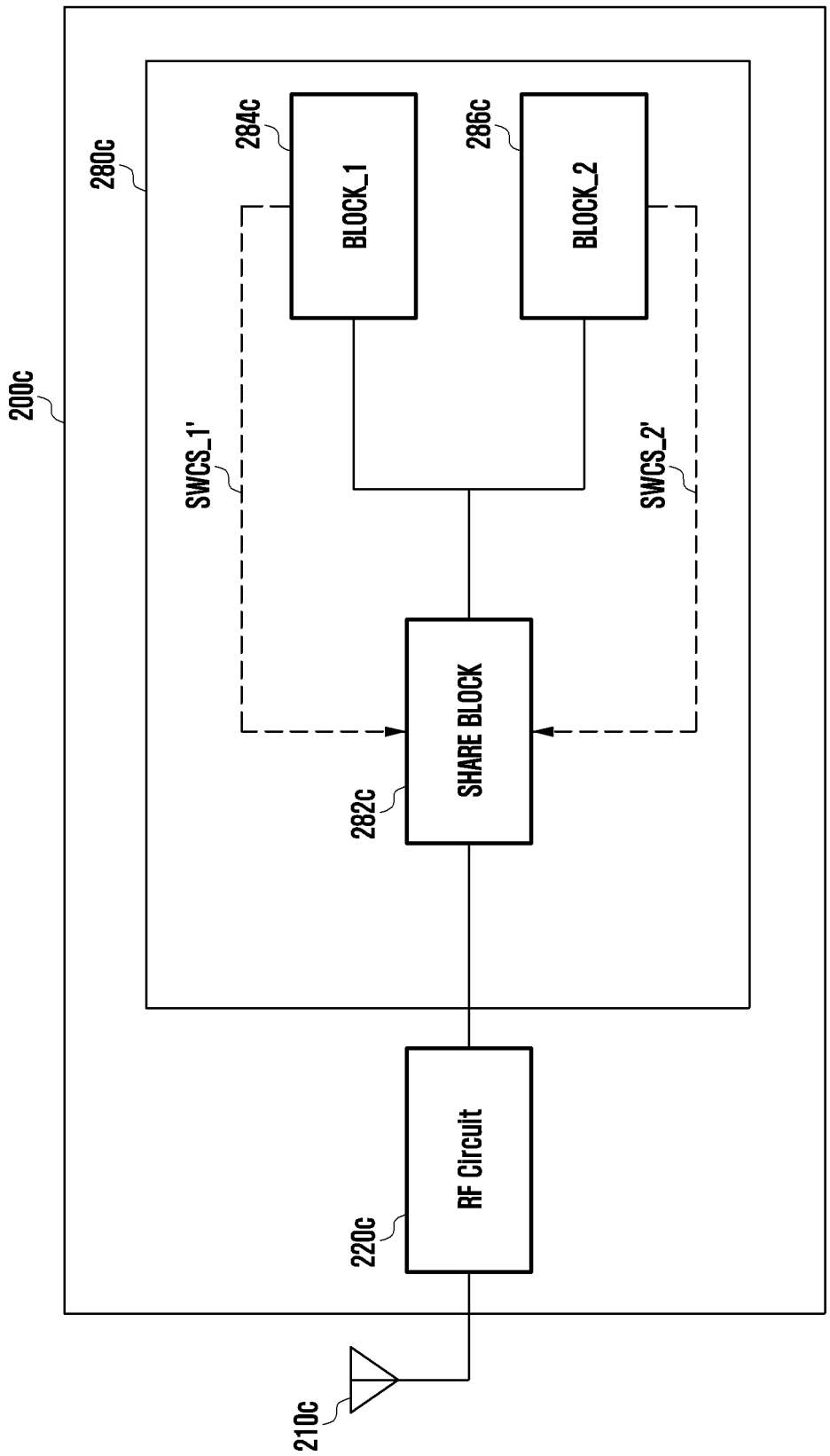
FIG. 1X is a block diagram illustrating the configuration of a wireless communication device according to an embodiment of the disclosure.

FIG. 1X is a block diagram illustrating the configuration of a wireless communication device 200c according to an embodiment of the disclosure.

Referring to FIG. 1X, the wireless communication device 200c may include an antenna 210c, an RF circuit 220c, and a baseband module 280c. The baseband module 280c may include a shared block 282c, a first block 284c for LTE wireless communication, and a second block 286c for NR wireless communication. The RF circuit 220c may receive a downlink signal including at least one of a first downlink signal and a second downlink signal, via the antenna 210c. The RF circuit 220c may convert a first downlink signal into a first baseband signal, and may convert a second downlink signal into a second baseband signal. The RF circuit 220c may transmit an uplink signal including at least one of a first uplink signal and a second uplink signal, via the antenna 210c. The RF circuit 220c may convert a first baseband signal into a first uplink signal, and may convert a second baseband signal into a second uplink signal.

The shared block 282c may include a filter for filtering a baseband signal received from the RF circuit 220c to remove an unnecessary frequency band, an automatic gain controller (AGC) for adjusting the size of a baseband signal, and an automatic frequency controller (AFC) for correcting frequency mismatch which may occur after sampling. Furthermore, the shared block 282c may further include a register that stores a command needed for operation of the shared block 282c. The shared block 282c may include a filter for filtering a baseband signal, which is to be transmitted to the RF circuit 220c, to remove an unnecessary frequency band, an automatic gain controller (AGC) for adjusting the size of a baseband signal, and an automatic frequency controller (AFC) for correcting frequency mismatch which may occur after sampling. In addition, a device for applying 7.5 kHz frequency shifting may be included. Furthermore, the shared block 282c may further include a register that stores a command needed for operation of the shared block 282c.

According to an embodiment, if the size of a subcarrier spacing (e.g., 15 kHz) in the 5G wireless communication is the same as the size of a subcarrier spacing (e.g., 15 kHz) fixedly used in the LTE wireless communication, the shared block 282c may further include a fast Fourier transform (FFT) sub-block that the first block 284c and the second block 286c may share. In this instance, if the size of a subcarrier spacing (e.g., 30 kHz) in the 5G wireless communication is different from the size of a subcarrier spacing (e.g., 15 kHz) fixedly used in the LTE wireless communication, the second block 286c may further include a sub-block that converts a signal, which is to be transmitted to the shared block 282c, into a signal corresponding to the size of a subcarrier spacing in the 5G wireless communication.

The first block 284c and the second block 286c may generate a first switching control signal (SWCS_1') and a second switching control signal (SWCS_2') and may provide the same to the shared block 282c, respectively. The shared block 282c may route a first baseband signal to the first block 284c, based on the first switching control signal (SWCS_1'), and may route a second baseband signal to the second block 286c, based on the second switching control signal (SWCS_2').

The above-described embodiments are summarized as follow.

First Embodiment

1. Standalone:
It is defined that only a UE, capable of performing 7.5 kHz frequency shifting in a corresponding TDD band, among UEs is allowed to access a cell in the corresponding band.
If SIB1 is received, a corresponding cell is a TDD band, and frequencyShift7p5kh is set to TRUE, a UE identifies a UE capability, and accesses the corresponding cell. (If there is no UE capability, the UE cannot access the cell).
In addition, after accessing the corresponding cell, consistently setting a corresponding field to 1 in UE capability, and transferring the same.

Second Embodiment

2. Non-Standalone:
In the case of access to LTE MeNB, access is allowed without limitation. Subsequently, in the EN-DC configuration, configuration is performed based on the same.
Upon reception of SIB1, a UE performs access (connection) when a condition satisfies a corresponding LTE TDD cell.
An eNB requests an EN-DC UE capability from the UE, and the UE reports UE capability information including 7.5 kHz frequency shifting capability.

The UE determines whether to configure EN-DC, and applies spectrum sharing.
If the UE is capable of performing 7.5 kHz frequency shifting, the UE configures EN-DC for the corresponding band, and applies spectrum sharing to the corresponding band.
If the UE is incapable of performing 7.5 kHz frequency shifting, the UE does not configure EN-DC for the corresponding band.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a base station in a wireless communication system, the method comprising:
   identifying a predetermined band;
   determining whether the predetermined band is a certain time division duplex (TDD) band among a plurality of new radio (NR) operating band supporting TDD and requires a 7.5 kHz frequency shifting for an uplink transmission;
   in case that the predetermined band is the certain TDD band and requires the 7.5 kHz frequency shifting, generating an indicator for the 7.5 kHz frequency shifting which indicates that the 7.5 kHz frequency shifting is enabled for the uplink transmission in the certain TDD band; and
   transmitting, to a user equipment (UE), a first system information message including the indicator.

2. The method of claim 1, further comprising:
   if the predetermined band does not require the 7.5 kHz frequency shifting, transmitting a second system information message to the UE without an indicator for the 7.5 kHz frequency shifting.

3. The method of claim 1, further comprising:
   receiving, from the UE, an uplink signal to which the 7.5 kHz frequency shifting is applied.

4. The method of claim 1, further comprising:
   determining whether the predetermined band corresponds to at least one of a frequency division duplex (FDD) band or a supplementary uplink (SUL) band, and requires the 7.5 kHz frequency shifting for the uplink transmission;
   in case that the predetermined band corresponds to the at least one of the FDD band or the SUL band, and requires the 7.5 kHz frequency shifting for the uplink transmission, generating the indicator for the 7.5 kHz frequency shifting; and
   transmitting, to the UE, a third system information message including the indicator.

5. A method performed by a user equipment (UE) in a wireless communication system, the method comprising:
   receiving, from a base station, system information including an indicator indicating whether a 7.5 kHz frequency shifting is enabled for a certain time division duplex (TDD) band among a plurality of new radio (NR) operating bands supporting TDD;
   identifying whether a frequency band for an uplink transmission is the certain TDD band, based on the system information; and
   transmitting, to the base station, an uplink signal in the frequency band by applying the 7.5 kHz frequency shifting, in case that the frequency band is the certain TDD band and the 7.5 kHz frequency shifting is enabled for the certain TDD band based on the indicator.

6. The method of claim 5, wherein in case that the indicator is configured as 'true', the 7.5 kHz frequency shifting is enabled for the uplink transmission in the certain TDD band.

7. The method of claim 5, wherein the uplink signal, to which the 7.5 kHz frequency shifting is applied, is a random access request signal.

8. The method of claim 5, further comprising:
transmitting, to the base station, a UE capability to support the 7.5 kHz frequency shifting for the certain TDD band.

9. The method of claim 5, further comprising:
transmitting, to the base station, the uplink signal, to which the 7.5 kHz frequency shifting is applied, in case that the frequency band corresponds to at least one of a frequency division duplex (FDD) band or a supplementary uplink (SUL) band.

10. A base station in a wireless communication system, the base station comprising:
a transceiver configured to perform signal transmission or reception with a base station or a user equipment (UE); and
a processor configured to control:
identify a predetermined band,
determine whether the predetermined band is a certain time division duplex (TDD) band among a plurality of new radio (NR) operating bands supporting TDD and requires a 7.5 kHz frequency shifting for an uplink transmission,
in case that the predetermined band is the certain TDD band and requires the 7.5 kHz frequency shifting for the uplink transmission, generate an indicator for the 7.5 kHz frequency shifting which indicates that the 7.5 kHz frequency shifting is enabled for the uplink transmission in the certain TDD band, and
transmit, to the UE, a first system information message including the indicator.

11. The base station of claim 10, wherein the processor is further configured to control to, if the predetermined band does not require the 7.5 kHz frequency shifting, transmit, to the UE, a second system information message without an indicator for the 7.5 kHz frequency shifting.

12. The base station of claim 10, wherein the processor is further configured to control to receive an uplink signal, to which the 7.5 kHz frequency shifting is applied, from the UE.

13. The base station of claim 10, wherein the processor is further configured to control to:
determine whether the predetermined band corresponds to at least one of a frequency division duplex (FDD) band or a supplementary uplink (SUL) band, and requires the 7.5 kHz frequency shifting for an uplink transmission,
in case that the predetermined band corresponds to the at least one of the FDD band or the SUL band, and requires the 7.5 kHz frequency shifting for the uplink transmission, generate the indicator for the 7.5 kHz frequency shifting, and
transmit, to the UE, a third system information message including the indicator.

14. A user equipment (UE) in a wireless communication system, the UE comprising:
a transceiver configured to perform signal transmission or reception with a base station; and
a processor configured to:
receive, from the base station, system information including an indicator indicating whether a 7.5 kHz frequency shifting is enabled for a certain time division duplex (TDD) band among a plurality of new radio (NR) operating bands supporting TDD,
identify whether a frequency band for an uplink transmission is the certain TDD band, based on the system information, and
transmit, to the base station, an uplink signal in the frequency band by applying the 7.5 kHz frequency shifting, in case that the frequency band is the certain TDD band and the 7.5 kHz frequency shifting is enabled for the certain TDD band based on the indicator.

15. The UE of claim 14, wherein in case that the indicator is configured as 'true', the 7.5 kHz frequency shifting is enabled for the uplink transmission in the certain TDD band.

16. The UE of claim 14, wherein the uplink signal, to which the 7.5 kHz frequency shifting is applied, is a random access request signal.

17. The UE of claim 14, wherein the processor is further configured to transmit, to the base station, a UE capability to support the 7.5 kHz frequency shifting for the certain TDD band.

18. The UE of claim 14, wherein the processor is further configured to transmit, to the base station, the uplink signal, to which the 7.5 kHz frequency shifting is applied, in case that the frequency band corresponds to at least one of a frequency division duplex (FDD) band or a supplementary uplink (SUL) band.

* * * * *